(12) United States Patent
Arahira

(10) Patent No.: US 9,030,731 B2
(45) Date of Patent: May 12, 2015

(54) QUANTUM ENTANGLED PHOTON PAIR GENERATOR

(71) Applicant: Oki Electric Industry Co., Ltd., Tokyo (JP)

(72) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 240 days.

(21) Appl. No.: 13/853,044

(22) Filed: Mar. 28, 2013

(65) Prior Publication Data

US 2013/0258453 A1 Oct. 3, 2013

(30) Foreign Application Priority Data

Mar. 29, 2012 (JP) ................................ 2012-076296

(51) Int. Cl.
*G02F 1/39* (2006.01)
*G06N 99/00* (2010.01)

(52) U.S. Cl.
CPC ........ *G02F 1/395* (2013.01); *G02F 1/39* (2013.01); *G06N 99/002* (2013.01)

(58) Field of Classification Search
USPC ................... 359/326–332; 380/356; 398/152; 356/450, 459–476
See application file for complete search history.

(56) References Cited

U.S. PATENT DOCUMENTS

| | | | | |
|---|---|---|---|---|
| 7,457,548 B2 * | 11/2008 | Tomaru | ......................... | 398/161 |
| 8,149,501 B2 * | 4/2012 | Arahira | ......................... | 359/328 |
| 8,228,507 B2 * | 7/2012 | Hirano et al. | .................. | 356/450 |
| 8,433,200 B2 * | 4/2013 | Arahira | ......................... | 398/142 |

FOREIGN PATENT DOCUMENTS

JP 2011048093 A * 3/2011 ................ G02F 1/39

OTHER PUBLICATIONS

Han Chuen Lim et al., "Stable source of high quality telecom-band polarization-entangled photon-pairs based on a single, pulse-pumped, short PPLN waveguide", Optics Express, vol. 16, No. 17, pp. 12460-12468, Aug. 4, 2008.

(Continued)

*Primary Examiner* — Daniel Petkovsek
(74) *Attorney, Agent, or Firm* — Rabin & Berdo, P.C.

(57) ABSTRACT

In a quantum entangled photon pair generator selectively generating polarization entangled photon pairs and time-bin entangled photon pairs, an excitation optical pulse shaper receives a linearly polarized optical pulse, and selectively outputs either one of a polarization excitation optical pulse pair to be a seedlight pulse for a polarization entangled photon pair and a consecutive excitation optical pulse pair to be a seedlight pulse for a time-bin entangled photon pair. An optical interferometer receives the polarization excitation optical pulse pair or the consecutive excitation optical pulse pair, and outputs a correlated photon pair forming signal and idler photons through a parametric fluorescence process. A quantum entangled photon pair extractor spatially extracting wavelength components corresponding to photons of the quantum entangled photon pair to output the components as the polarization entangled photon pair or the time-bin entangled photon pair.

12 Claims, 10 Drawing Sheets

(56) References Cited

OTHER PUBLICATIONS

J. F. Dynes et al., "Efficient entanglement distribution over 200 kilometers", Optics Express, vol. 17, No. 14, pp. 11440-11449, Jun. 23, 2009.

Shin Arahira et al., "Generation of polarization entangled photon pairs at telecommunication wavelength using cascaded $\chi^{(2)}$ processes in a periodically poled $LiNbO_3$ ridge waveguide", Optics Express, vol. 19, No. 17, pp. 16032-16043, Aug. 8, 2011.

* cited by examiner

QUANTUM ENTANGLED PHOTON PAIR GENERATOR

BACKGROUND OF THE INVENTION

1. Field of the Invention

The present invention relates to a quantum entangled photon pair generator, which is applicable to quantum information and communication systems, such as quantum cryptography and quantum computers. In particular, the present invention relates to a quantum entangled photon pair generator which can selectively output either of polarization entangled photon pairs and time-bin entangled photon pairs.

2. Description of the Background Art

The technology for generating quantum entangled photon pairs is key engineering for implementing quantum information and communication systems, such as quantum cryptography and quantum computers, in which the quantum-mechanical behavior of light, or photons, is utilized. In particular, the quantum key delivery technology utilizing quantum entangled photon pairs can expect an application to ultimate, secure encryption communication, and attracts attention in recent years. In the context, the quantum-mechanical behavior means a behavior in accordance with the superposition principle or the like that several different states can be taken at the same time.

As for the quantum entangled photon pairs to be utilized for quantum key distribution, polarization entangled photon pairs and time-bin entangled photon pairs have predominantly been studied so far. The former is presented by, for example, H. C. Lim, et al., "Stable source of high quality telecom-band polarization-entangled photon pairs based on a single, pulse-pumped, short PPLN waveguide", Optics Express, vol. 16, No. 17, pp. 12460-12468 (2008). The latter is disclosed by, for example, J. F. Dynes, et al., "Efficient entanglement distribution over 200 kilometers", Optics Express, vol. 17, No. 14, pp. 11440-11449 (2009).

Polarization entangled photon pairs are photon pairs in which the polarizations of individual photons are not determined but the relationship of the polarizations measured is determined, such as parallel or orthogonal to each other. That is, polarization entangled photon pairs are in a state where a photon pair has its plural polarizations in combination superposed to each other and the polarizations are correlated between photon pairs.

Time-bin entangled photon pairs, considering two time slots to be observed in which photons in pair may possibly exist, are photon pairs in which it is not determined in which time slot individual photons exist but is determined the relationship of measurement results in which two photons definitely exist in one and the same time slot. That is, time-bin entangled photon pairs are in a state where photons in pair are distributed to plural time slots for the photon pair to overlap with each other and the photon pairs are correlated in temporal position therebetween.

As a transmission medium of quantum entangled photon pairs, optical fiber can be used. If optical fiber is used as a transmission medium, it is possible to lengthen a quantum key delivery distance due to the lower transmission loss of the optical fiber.

The polarization entangled photon pair generator has high compatibility with a quantum repeater provided on an optical transmitting path, and it is therefore advantageous to utilize it for the long-distance quantum key delivery system using a quantum repeater. The polarization entangled photon pair generator has high compatibility also with a quantum entangled state of electrons utilizing electronic spin, which is expected to become predominant in the computation by quantum computers. The polarization entangled photon pair generator is therefore advantageous to be utilized as an interface between electrons and photons when connecting a plurality of quantum computers in parallel, for example.

However, optical fibers have statistical birefringent property, so that the polarization state of photons after transmitted may generally be fluctuated. When taking account of polarization entangled photon pairs to be applied to a quantum key delivery system using optical fiber, a polarization control mechanism is required for maintaining the polarization state of photons constant.

Meanwhile, in quantum key delivery systems which use time-bin entangled photon pairs, as an asymmetric Mach-Zehnder interferometer which constitutes a receiver of photons, a polarization-independent device may be selected. In that case, a stable system action can be achieved regardless of fluctuation in the polarization state of quantum entangled photon pairs. This feature of quantum key delivery system utilizing time-bin entangled photon pair generator contributes efficiently to a practical use of a quantum key delivery system using optical fiber.

However, there are the following disadvantages in use of time-bin entangled photon pair generator. First, the generation rate of an encryption key is, in principle, about half as high as the generation rate of polarization entangled photon pairs. Moreover, when it is considered that the transmission distance of an encryption key is lengthened using a quantum repeater in a quantum key delivery system, the advantages of polarization independency which is obtained by using time-bin entangled photon pairs cannot efficiently be enjoyed since existing quantum repeaters have polarization dependency.

As described above, polarization entangled photon pairs and the time-bin entangled photon pairs involve their own advantages and disadvantages. Therefore, quantum key delivery systems, quantum computers and the like utilizing quantum entangled photon pairs would be preferable if they are constituted so that polarization entangled photon pairs and time-bin entangled photon pairs can selectively be used in accordance with utility systems. If a quantum entangled photon pair generator is achieved which can selectively generate either of polarization entangled photon pairs and time-bin entangled photon pairs with a simple manner, it would be convenient for applying photon pairs to quantum key delivery systems, quantum computers or the like.

The inventor of the present application has found that, if a system is realized which can select either of a pair of optical pulses of which the polarization planes are orthogonal to each other (which may hereinafter be referred to as polarization excitation optical pulse pair) and a pair of optical pulses which have the same polarization state and exist in different positions on the time axis (which may hereinafter be referred to as consecutive excitation optical pulse pair) to generate the selected pair of optical pulses by a simple manner, it is then possible to selectively generate polarization entangled photon pairs and time-bin entangled photon pairs. In other words, if the polarization excitation optical pulse pair or the consecutive excitation optical pulse pair (which may hereinafter be simply referred to as excitation optical pulse) is utilized as a seedlight pulse for photon pair generation, then the correlated photon pairs including signal photons and idler photons can be generated through a parametric fluorescence process. Then, the correlated photon pairs, which are generated using polarization excitation optical pulse pairs and consecutive excitation optical pulse pairs as a seedlight pulse, are polarization entangled photon pairs and time-bin entangled photon pairs, respectively. Hereinafter, signal photons and idler photons are referred to as a signal light and an idler light, respectively.

SUMMARY OF THE INVENTION

It is therefore an object of the present invention to provide a quantum entangled photon pair generator which can selectively generate either of polarization entangled photon pairs and time-bin entangled photon pairs in a simple manner.

In accordance with the present invention, there is provided a quantum entangled photon pair generator which includes an excitation optical pulse shaper, an optical interferometer, and a quantum entangled photon pair extractor. The excitation optical pulse shaper receives a linearly polarized optical pulse, and selectively outputs either one of a polarization excitation optical pulse pair to be a seedlight pulse for a polarization entangled photon pair and a consecutive excitation optical pulse pair to be a seedlight pulse for a time-bin entangled photon pair. Pulses of the polarization excitation optical pulse pair have substantially the same peak intensity and respective polarization directions orthogonal to each other. Pulses of the consecutive excitation optical pulse pair have substantially the same peak intensity and linearly polarized to appear at different positions on the time axis. The optical interferometer receives the polarization excitation optical pulse pair or the consecutive excitation optical pulse pair, and outputs a correlated photon pair which includes signal and idler photons generated through a parametric fluorescence process. The quantum entangled photon pair extractor spatially extracts, i.e. selects and spatially separates, wavelength components corresponding to the signal and idler photons to output extracted wavelength components as the polarization entangled photon pair or the time-bin entangled photon pair.

If the polarization excitation optical pulse pair is selected and input to the optical interferometer of the quantum entangled photon pair generator, then a polarization entangled photon pair is generated. If the consecutive excitation optical pulse pair is selected and input to the optical interferometer, then a time-bin entangled photon pair is generated. In turn, the quantum entangled photon pair extractor eliminates wavelength components other than the wavelength component corresponding to the polarization excitation optical pulse pair or the consecutive excitation optical pulse pair, and the polarization entangled photon pair or time-bin entangled photon pair which are generated through the parametric fluorescence process to output a desired polarization entangled photon pair or time-bin entangled photon pair.

Also in accordance with the present invention, a quantum entangled photon pair generator includes an excitation optical pulse shaper and a quantum entangled photon pair generator and extractor. The excitation optical pulse shaper receives a linearly polarized optical pulse, and selectively outputs either one of a polarization excitation optical pulse pair to be a seedlight pulse for a polarization entangled photon pair and a consecutive excitation optical pulse pair to be a seedlight pulse for a time-bin entangled photon pair. Pulses of the polarization excitation optical pulse pair have substantially the same peak intensity and respective polarization directions orthogonal to each other. Pulses of the consecutive excitation optical pulse pair have substantially the same peak intensity and linearly polarized to appear at different positions on the time axis. The quantum entangled photon pair extractor receives the polarization excitation optical pulse pair or the consecutive excitation optical pulse pair to generate a correlated photon pair which includes signal and idler photons generated through a parametric fluorescence process, and spatially extracts, i.e. selects and spatially separates, wavelength components corresponding to the signal and idler photons to output extracted wavelength components as the polarization entangled photon pair or the time-bin entangled photon pair.

If the polarization excitation optical pulse pair is selected and input to the quantum entangled photon pair generator and extractor of the second quantum entangled photon pair generator, then a polarization entangled photon pair is generated. If the consecutive excitation optical pulse pair is selected and input to the quantum entangled photon pair generator and extractor, then a time-bin entangled photon pair is generated. Then, wavelength components other than the wavelength component corresponding to the excitation optical pulse, and the polarization entangled photon pair or time-bin entangled photon pair which are generated through the parametric fluorescence process are eliminated to output desired polarization entangled photon pair or time-bin entangled photon pair.

Generally in accordance with the quantum entangled photon pair generator, either one of the polarization excitation optical pulse pair and the consecutive excitation optical pulse pair is generated by the excitation optical pulse shaper.

In the excitation optical pulse shaper of the quantum entangled photon pair generator, which of the polarization excitation optical pulse pair or the consecutive excitation optical pulse pair to be output is to be selected may simply be implemented, as described below, by rotating the optic axis of the half-wave plate that is a component of the excitation optical pulse shaper. Thus, according to the quantum entangled photon pair generators of the present invention, it is possible to selectively generate the polarization entangled photon pairs and the time-bin entangled photon pair with a simple manner.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Now, with reference to the accompanying drawings, preferred embodiments of a quantum entangled photon pair generator according to the present invention will be described. In the following description, although specific elements, operational conditions and so on may be described, they are merely illustrative and should not be understood as restrictive to the present invention. In addition, FIGS. 1 through 6 and 8 illustrate configurational examples of the whole or part of generators according to the present invention to the extent that the schematically illustrative arrangements of the components and the like contribute to understanding the invention by the aid of the embodiments, and thus the present invention would not be limited to the illustrated examples.

Figure 1:
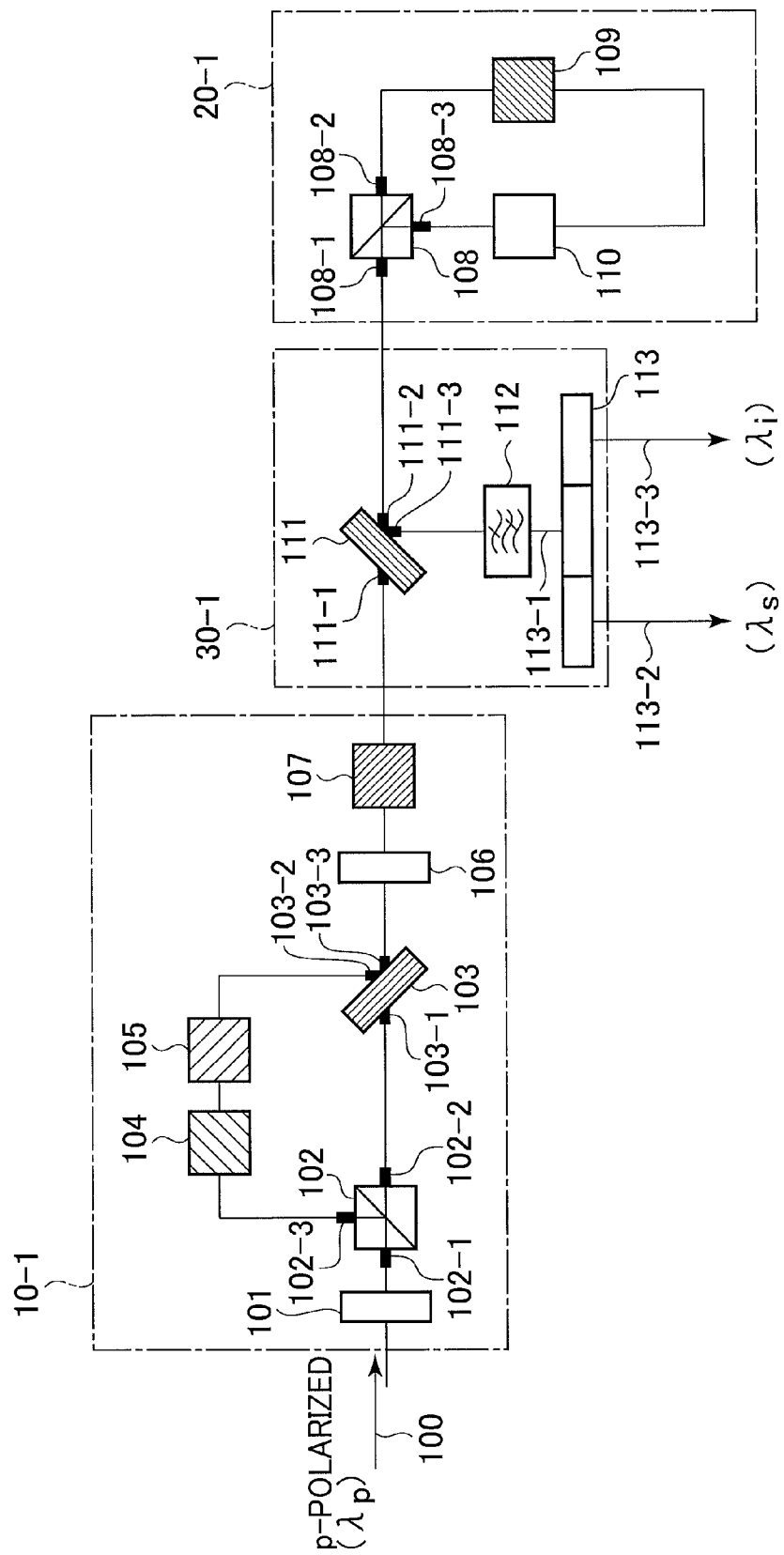
FIG. 1 is a schematic block diagram of a quantum entangled photon pair generator according to an illustrative embodiment of the present invention.

With reference first to FIG. 1, the constitution of a preferred embodiment of the quantum entangled photon pair generator according to the present invention will be described. The quantum entangled photon pair generator includes an excitation optical pulse shaper 10-1, an optical interferometer 20-1, and a quantum entangled photon pair extractor 30-1, which are interconnected as illustrated.

The excitation optical pulse shaper 10-1 can receive a linearly polarized optical pulse 100 on its input, and selectively output either one of polarized excitation optical pulse pairs (at least a polarized excitation optical pulse pair) or consecutive excitation optical pulse pairs (at least a consecutive excitation optical pulse pair). The wavelength of the excitation optical pulse 100 input to the excitation optical pulse shaper 10-1 will be represented by $\lambda_p$, and the wavelengths of a signal light and an idler light which form a quantum entangled photon pair will be represented by $\lambda_s$, and $\lambda_i$, respectively. In a case of implementing long-distance key distribution using an optical fiber transmitting line, it is desirable to set the wavelengths of the signal and idler lights, or beams, to around 1.55 micrometers, which is a wavelength band in which optical absorption loss is lower.

The excitation optical pulse shaper 10-1 includes a first half-wave plate 101, a first polarization splitter/combiner 102, a half mirror 103, a first 90-degree polarization rotator 104, an optical delay device 105, a second half-wave plate 106, and a birefringent medium 107, which are interconnected as depicted.

The linearly polarized optical pulse 100 input to the excitation optical pulse shaper 10-1 passes the first half-wave plate 101 and then input to one input/output port 102-1 of the first polarization splitter/combiner 102. The first half-wave plate 101 rotates the polarization plane of the linearly polarized optical pulse by 0 or 45 degrees.

The first polarization splitter/combiner 102 has its three input/output ports 102-1, 12-2 and 102-3, and separates the input light, which is input to the one input/output port 102-1, into two linear polarization components that are orthogonal to each other. The first polarization splitter/combiner 102 outputs one linear polarization component from the other input/output port 102-2, and outputs the other linear polarization component from the remaining input/output port 102-3.

Hereinafter, the polarization direction of the linear polarization component output from the input/output port 102-2 will be referred to as p-polarization, or p-polarized, and the polarization direction of the linear polarization component output from the input/output port 102-3 will be referred to as s-polarization, or s-polarized. In addition, with respect to a second polarization splitter/combiner 108, which will be described later, the polarization direction of the linear polarization component input to/output from the input/output port 108-2 of the splitter/combiner 108 will be referred to as p-polarization, or p-polarized, and the polarization direction of the linear polarization component input to/output from the input/output port 108-3 of the splitter/combiner 108 will be referred to as s-polarization, or s-polarized.

The half, or semitransparent, mirror 103 has its three input/output ports 103-1, 103-2 and 103-3. An output optical pulse output from the input/output port 102-2 of the first polarization splitter/combiner 102 is input to the input/output port 103-1 of the half mirror 103. An output optical pulse output from the input/output port 102-3 of the first polarization splitter/combiner 102 passes the first 90-degree polarization rotator 104 and the optical delay device 105 in order, and is input to the input/output port 103-2 of the half mirror 103. The half mirror 103 combines the optical pulses input to the input/output ports 103-1 and 103-2 with each other, and outputs the combined optical pulses from the input/output port 103-3.

The first 90-degree polarization rotator 104 rotates the polarization plane of the linearly polarized optical pulse, which is output from the input/output port 102-3 of the first polarization splitter/combiner 102, by 90 degrees. The first 90-degree polarization rotator 104 and the optical delay device 105 may be arranged on one of two optical paths between the first polarization splitter/combiner 102 and the half mirror 103. Therefore, when combining the optical pulses propagated respective optical paths in the half mirror 103, both optical pulses are in the same polarization state of linear polarization. When the optical pulses propagated respective optical paths are combined in the half mirror 103, a difference of time delay, represented by τ, may be produced between both optical pulses due to the difference in optical path length between both optical paths. The optical delay device 105 adjusts the amount of time delay to give to the linearly polarized optical pulse output from the first 90-degree polarization rotator 104.

After the excitation optical pulse is separated by the first polarization splitter/combiner 102, the optical delay device 105 adjusts the relative light phase difference of optical carrier waves of two separated excitation optical pulses to an arbitrary value, at the time of combining by the half mirror 103. Alternatively, in order to allow fine adjustment in case the difference in the optical path length of two optical paths between the first polarization splitter/combiner 102 and the half mirror 103 does not match a desired difference of time delay (τ), the optical delay device 105 may be adapted to function to give time delay to the envelope of the optical pulse. As the optical delay device 105, a suitable circuit device selected from commercially available optical delay devices can be used, for example. The optical delay device 105 can be implemented by a spatial optical system or can also be implemented by a combination of optical delay devices.

For example, commercially available polarization beam splitters can be selected to be used as the first and second polarization splitter/combiners 102 and 108. Alternatively, a polarizing prism using a birefringent crystal can also be used.

An output optical pulse output from the input/output port 103-3 of the half mirror 103 passes the second half-wave plate 106 and the birefringent medium 107 in order, and is output from the excitation optical pulse shaper 10-1 in the form of excitation optical pulse. The second half-wave plate 106 rotates the polarization plane of the output optical pulse, which is output from the input/output port 103-3 of the half mirror 103, by 0 or 45 degrees. The birefringent medium 107 arbitrarily provides an optical phase difference between orthogonal optic axes of the output optical pulse from the second half-wave plate 106. As the first and second half-wave plates 101 and 106, optical modules or the like can be used, which have a function capable of rotating an optic axis.

A preferred configuration example of the first 90-degree polarization rotator 104 will be described below. That is, an optical module constitution may be used in which the first polarization splitter/combiner 102 and the optical delay device 105 are connected by a polarization-preserving optical fiber, which is fabricated by cutting it once at a location and fusing the cuts to be joined again with each other with the optical axes (fast and slow axes) thereof on the cut planes being relatively rotated by 90 degrees. The first 90-degree polarization rotator 104 may be formed by a half-wave plate.

As the birefringent medium 107, it is desirable to utilize a medium which can provide an arbitrary optical phase difference between orthogonal optic axes. In the instant embodiment, it is sufficient to ensure the operation for the wavelength of the excitation light. A suitable example of such birefringent medium 107 is a Babinet-Soleil compensator.

The optical interferometer 20-1 is formed into a Sagnac interferometer type of optical loop (which may hereinafter be simply referred to as an optical loop) in which the second polarization splitter/combiner 108 having its three input/output ports 108-1, 108-2 and 108-3 connecting the input/output ends of the optical path to form an optical path loop, on which a nonlinear optical medium 109 and a second 90-degree polarization rotator 110 are arranged.

The optical interferometer 20-1 receives on its input the excitation optical pulse, which has been output from the excitation optical pulse shaper 10-1 and passed the quantum entangled photon pair extractor 30-1. The optical interferometer 20-1 generates correlated photon pairs which form signal and idler lights, through parametric fluorescence process, in the form of polarization entangled photon pairs or time-bin entangled photon pair photon pairs.

For the nonlinear optical medium 109, a nonlinear optical medium capable of generating parametric fluorescence can be used. For example, available are a nonlinear optical medium which exhibits the second-order nonlinear optical effect, such as $LiNbO_3$ crystal in which a periodic-polarization inverting structure is formed, or another nonlinear optical medium which exhibits the third-order nonlinear optical effect, such as an optical fiber.

In cases where the second-order nonlinear optical medium is used as the nonlinear optical medium 109, the correlated photon pairs are generated by cascaded second harmonic generation (SHG)/spontaneous parametric down conversion (SPDC) process. More specifically, when an input excitation optical pulse with a wavelength $\lambda_p$ is input, an SHG light with its half wavelength ($\lambda_p/2$) is generated, and the signal light with a wavelength $\lambda_s$ and the idler light with a wavelength $\lambda_i$, constituting the correlated photon pair, are generated at the same time by the SPDC process in which the SHG light is the seedlight pulse.

By contrast, in cases where the third-order nonlinear optical medium is used as the nonlinear optical medium 109, the correlated photon pairs are generated by spontaneous four-wave mixing (SFWM) process. More specifically, when the input excitation optical pulse with the wavelength $\lambda_p$ is input, the signal light with the wavelength $\lambda_s$ and the idler light with the wavelength $\lambda_i$, constituting the correlated photon pair, are generated at the same time by the SFWM process.

Regardless of which of the second-order and third-order nonlinear optical media is used as the nonlinear optical medium 109, the wavelength $\lambda_p$ of the input excitation optical pulse, the wavelength $\lambda_s$ of the signal light, and the wavelength $\lambda_i$ of the idler light hold a relationship expressed by the following expression (1), which corresponds to the energy-conservation law, where $\lambda_p$, $\lambda_s$ and $\lambda_i$ are wavelengths in vacuum.

$$2/\lambda_p = 1/\lambda_s + 1/\lambda_i \tag{1}$$

where $\lambda_s$ is not equal to $\lambda_p$, and $\lambda_i$ is not equal to $\lambda_p$.

Even in a case where the second-order nonlinear optical medium is used as the nonlinear optical medium 109, the SPDC process may be adapted to generate correlated photon pairs, such as described in Lim et al., described earlier. In this case, when the input excitation optical pulse with the wavelength $\lambda_p$ is input, the correlated photon pairs are generated which form signal and idler lights with the wavelength substantially twice as long as the input excitation optical pulse. The relationship in this SPDC process, which corresponds to the energy-conservation law, is expressed by the following expression (2).

$$1/\lambda_p = 1/\lambda_s + 1/\lambda_i \tag{2}$$

The quantum entangled photon pair generator in the instant embodiment can implement the correlated photon pairs which are generated by either of the above-described parametric fluorescence processes.

The second 90-degree polarization rotator 110 rotates the polarization planes of the excitation optical pulse and the signal and idler lights by 90 degrees. The second 90-degree polarization rotator 110 can be fabricated by cutting it once at a location and fusing the cuts to be joined again with each other with optical axes (fast and slow axes) thereof on the cut planes being relatively rotated by 90 degrees. The second 90-degree polarization rotator 110 may be formed by a half-wave plate.

In the processes of generating the correlated photon pairs which form the quantum entangled photon pairs described below, when the cascaded SHG/SPDC processes in the second-order nonlinear optical medium is used and when the SFWM process in the third-order nonlinear optical medium is used, the excitation optical pulse and the signal and idler lights have nearly the same wavelength, for example, around 1.55 micrometers, and therefore a half-wave plate which operates at 1.55 micrometers may be used as the second 90-degree polarization rotator 110.

The quantum entangled photon pair extractor 30-1 selects and spatially separates wavelength components corresponding to the signal and idler lights, and outputs the separated lights. More specifically, the quantum entangled photon pair extractor 30-1 extracts only the wavelength components of the quantum entangled photon pairs in the output light from the optical interferometer 20-1, and outputs the extracted components to the outside of the quantum entangled photon pair generator of the embodiment. A preferred configuration example of the quantum entangled photon pair extractor 30-1 may include an optical band-pass filter 111, a wavelength separation filter 113, and an optical low-pass filter 112, which are interconnected as illustrated in FIG. 1.

The optical band-pass filter 111 separates the output light incoming from the excitation optical pulse shaper 10-1 into a transmission light component and a reflecting light component, and outputs the light components. The optical low-pass filter 112 eliminates wavelength components other than the wavelength components corresponding to the correlated photon pairs from the output light which is output from the optical band-pass filter 111. The wavelength separation filter 113 splits the output light 112-1 from the optical low-pass filter 112 into the signal and idler lights 113-2 and 113-3 which form the quantum entangled photon pair, and outputs the resultant lights on its respective, separate optical ports 113-2 and 113-3, respectively. In the application, signals are designated with reference numerals of connections on which they are conveyed.

The optical band-pass filter 111 has its three input/output ports 111-1, 111-2 and 111-3. The optical band-pass filter 111 selectively transmits only the wavelength component in the vicinity of the wavelength $\lambda_p$ from the input light input to the input/output port 111-1, and outputs the wavelength component from the input/output port 111-1. On the other hand, the light components including at least the wavelength components of the signal and idler lights, among the light components other than the transmission wavelength component, that is, among the reflecting wavelength component, are output from the input/output port 111-3. In addition, only the wavelength component in the vicinity of the wavelength $\lambda_p$ is selectively output from the input/output port 111-2 in the input lights which are input to the input/output port 111-1. As the optical band-pass filter 111, an optical filter can be used which is a kind of optical filter utilizing a dielectric multi-layer, and which is now commercially available as an optical band-pass filter. Moreover, an AWG (Arrayed Waveguide Gratings) type WDM (Wavelength Division Multiplexing) filter can also be used, as described below.

The optical low-pass filter 112 eliminates the wavelength components substantially half as long as the wavelength of the signal and idler lights in the output light from the input/output port 111-3 of the optical band-pass filter 111, such as the wavelength component ($\lambda_p/2$) of the SHG light produced when the cascaded SHG/SPDC processes exhibit, or the wavelength component of the excitation light utilized to exhibit the SPDC process.

The transmission wavelength of the optical low-pass filter 112 corresponds to the residual light component (wavelength $\lambda_p$) with the wavelength of the excitation light utilized to exhibit the cascaded SHG/SPDC processes and the SFWM process, the wavelength component (wavelength $\lambda_s$) of the signal light, and the wavelength component (wavelength $\lambda_i$) of the idler light. It is to be noted that the optical low-pass filter 112 may be unnecessary in the cases where the third-order nonlinear optical medium is utilized as the nonlinear optical medium 109 because the SHG light is not produced.

The wavelength separation filter 113 splits the transmitted light of the optical low-pass filter 112 into at least the wavelength component of the signal light and the wavelength component of the idler light, and outputs the resultant components on respective, separate optical ports. The photon pairs of the signal and idler lights output from the wavelength separation filter 113 are provided for a practical use as the polarization entangled photon pairs or the time-bin entangled photon pairs generated by the quantum entangled photon pair generator of the present embodiment.

As the wavelength separation filter 113, an AWG type WDM filter or the like may be used, which can transmit both wavelengths of the signal and idler lights.

The quantum entangled photon pair generator of the instant illustrative embodiment is preferably constituted by a polarization-preserving optical system. Under that condition, the constituent components of the generator may preferably have the respective optic axes thereof defined with a specific relationship considered as described below. The generator may be constituted such that discrete optical components are spatially arranged and coupled by optical coupling lenses, or alternatively may be constituted in the form of optical module which has its optical components coupled by polarization-preserving fibers. Whichever constitution is used, it is desirable to constitute a polarization-maintaining optical system throughout the components up to its light output end where the signal and idler lights are separated from each other and ultimately output on its separate optical ports.

By contrast, even when the quantum entangled photon pair generator of the embodiment is implemented by an optical module for use in optical coupling by a normal optical fiber, without polarization preserving property, rather than a polarization-preserving fiber, an additional optical device such as a polarization plane controller may be used to virtually constitute a polarization-maintaining optical system.

Now, operations will be described. The following description will be proceeded to on the illustrative embodiment where the LiNbO$_3$ crystal which has the periodic-polarization inverting structure formed on a z-cut LiNbO$_3$ substrate (Periodically Poled Lithium Niobate, or PPLN, crystal) is used as the nonlinear optical medium 109. The PPLN crystal can serve as a second-order nonlinear optical medium. On the assumption that the cascaded SHG/SPDC processes are used as the parametric fluorescence generation process for generating the correlated photon pairs, and that a tensor component d$_{33}$ of the second-order nonlinear optical constant is used for SHG generation and SPDC generation, operations will be described in generating the polarization entangled photon pairs and time-bin entangled photon pairs by the quantum entangled photon pair generator of the instant embodiment.

The generation of the correlated photon pairs through the cascaded SHG/SPDC processes, in which the second-order nonlinear optical medium is used as the nonlinear optical medium 109, is disclosed in, for example, Arahira, et al., "Generation of polarization entangled photon pairs at telecommunication wavelength using cascaded $\chi^{(2)}$ processes in a periodically poled LiNbO$_3$ ridge waveguide", Optics Express, vol. 19, No. 17, pp. 16032-16043, (2011).

The linearly polarized light which is polarized in the z-direction of the PPLN crystal is input to the nonlinear optical medium 109. The SHG light and the signal and idler lights, which are generated by the PPLN crystal, are also linearly polarized lights which are polarized in the z-direction. In the following description, it is assumed that the polarization direction of the linearly polarized optical pulse 100 input to the excitation optical pulse shaper 10-1 matches the p-polarization direction.

(1) Operation as the Polarization Entangled Photon Pair Generator

Figure 2:
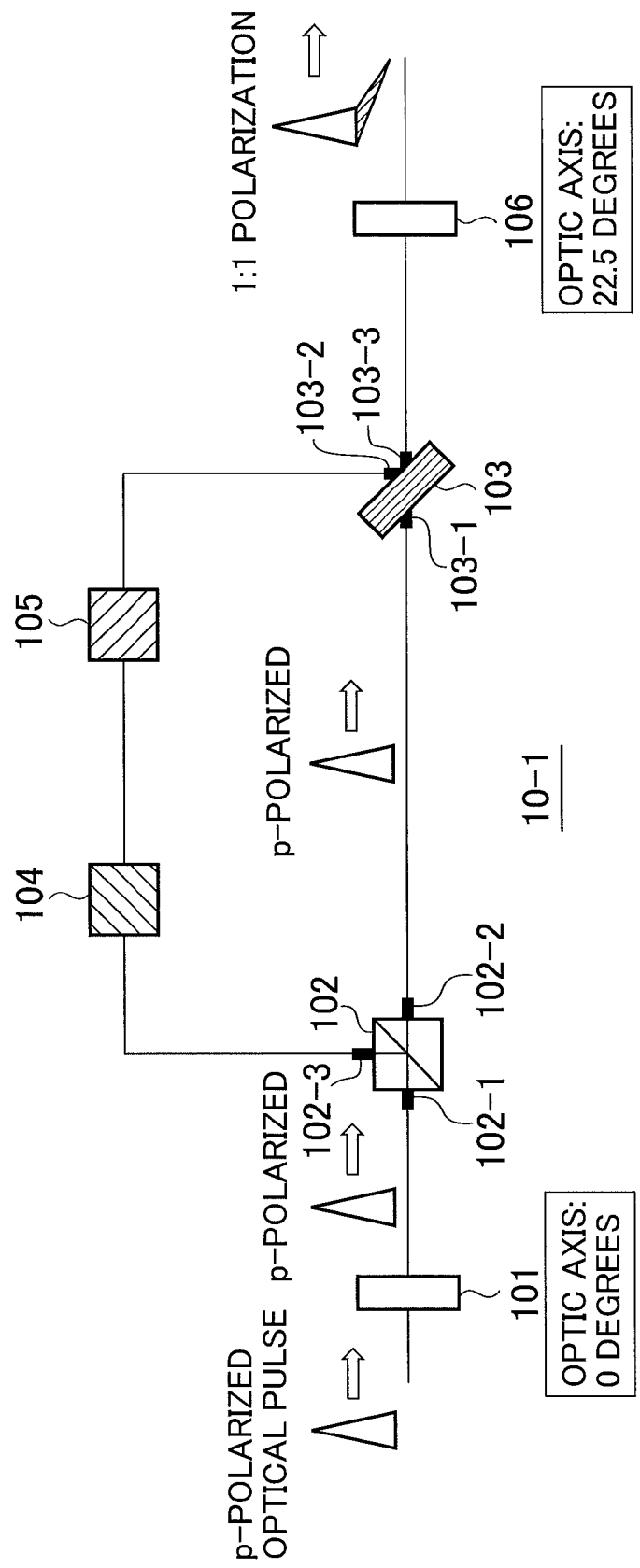
FIG. 2 is a schematic block diagram of the excitation optical pulse shaper shown in FIG. 1, useful for understanding setting conditions of respective optical components of the pulse shaper when generating polarization entangled photon pairs.

With reference to FIGS. 1 and 2, description will be made for a case where the quantum entangled photon pair generator of the illustrative embodiment operates as a polarization entangled photon pair generator. FIG. 2 illustrates a schematic constitution of the excitation optical pulse shaper 10-1, and shows the polarization states of the optical pulses input to and output from each optical component, and the setting conditions of each optical component, for generating the polarization entangled photon pairs. In the figure, the p-polarization (component) is illustrated by white isosceles triangles, and s-polarization (component) is illustrated by an inclined isosceles triangle which is shaded.

First, the p-polarized optical pulse is generated using a light source and optical components, not shown, which may be conventional per se, and is input to the first half-wave plate 101. The first half-wave plates 101 have the one optic axis thereof made to match in direction with the p-polarization direction. Accordingly, the optical pulse is output, without its polarization plane being rotated, from the first half-wave plate 101, in the form of linearly polarized optical pulse with p-polarization.

The optical pulse output from the first half-wave plate 101 is input to the input/output port 102-1 of the first polarization splitter/combiner 102. Then, since the input optical pulse to the input/output port 102-1 of the first polarization splitter/combiner 102 is p-polarized, the input optical pulse is output as a p-polarized optical pulse from the input/output port 102-2 of the first polarization splitter/combiner 102. The p-polarized optical pulse output from the input/output port 102-2 of the first polarization splitter/combiner 102 is input to the input/output port 103-1 of the half mirror 103, and is output from the input/output port 103-3 of the half mirror 103. The peak intensity of the optical pulse output from the input/output port 103-3 of the half mirror 103 becomes one half as high as the peak intensity of the optical pulse input to the input/output port 103-1 of the half mirror 103, but the polarization state remains p-polarized.

The optical pulse output from the input/output port 103-3 of the half mirror 103 is input to the second half-wave plate 106. The direction of the optic axis of the second half-wave plate 106 is rotated in advance by 22.5 angular degrees with respect to the direction of p-polarization. By this means, the polarization plane of the optical pulse to be output from the second half-wave plate 106 will be rotated by 45 degrees with respect to the direction of p-polarization. The linearly polarized light in which the polarization plane is inclined by 45 degrees from the direction of p-polarization, which may hereinafter be referred to as a 45-degree linearly polarized light, can be considered as a sum of the p-polarization and s-polarization components, both of which have identical intensity to each other. Hereinafter, such polarization equally including the p-polarization and s-polarization components may be referred to as 1:1 polarization. In the 1:1 polarization, the intensity ratio of the p-polarization and s-polarization components is only 1:1, but the optical phase difference between both of the polarization components is not necessarily zero.

The optical pulse output from the second half-wave plate 106 passes the birefringent medium 107. Each of orthogonal optic axes of the birefringent medium 107 is arranged so that the optic axes match the directions of the p-polarization and the s-polarization, respectively. More specifically, those optic axes and the polarization direction of the 45-degree linearly polarized light form an angle of 45 degrees with respect to each other. Moreover, the optical phase difference between the optic axes produced in the birefringent medium 107 can be set arbitrarily. By this means, the optical pulse having passed through the birefringent medium 107 serves as the 1:1 polarization, to which a desired light phase difference is given between the p-polarization and s-polarization components.

As described above, the excitation optical pulse shaper 10-1 has a function to generate and output the optical pulse with 1:1 polarization when the linearly polarized optical pulse with p-polarization is input. The peak intensities of the p-polarization and s-polarization components of the optical pulse with 1:1 polarization, which is output from the excitation optical pulse shaper 10-1, are one fourth of the peak intensity of the p-polarized optical pulse, which is input to the excitation optical pulse shaper 10-1.

As illustrated in FIG. 1, the optical pulse with 1:1 polarization (polarization excitation optical pulse pair) output from the excitation optical pulse shaper 10-1 once passes through the quantum entangled photon pair extractor 30-1, and is input to the input/output port 108-1 of the second polarization splitter/combiner 108 included in the optical interferometer 20-1. The input light to the input/output port 108-1 is the optical pulse with 1:1 polarization, and thus the p-polarized and s-polarized optical pulses, both having equal peak intensity, are output from the input/output ports 108-2 and 108-3, respectively.

The optical pulse output from the input/output port 108-2 and propagating in the clockwise direction over the optical loop is input to the nonlinear optical medium 109 (PPLN crystal) in unchanged p-polarization state. In the nonlinear optical medium 109, the correlated photon pairs forming the signal and idler lights are generated by the cascaded SHG/SPDC processes. All of the optical pulse (excitation optical pulse) output from the input/output port 108-2, and the SHG light and the signal and idler lights which are generated in the nonlinear optical medium 109 are in the p-polarization state.

The excitation optical pulse, the SHG light and the signal and idler lights, which are output from the nonlinear optical medium 109 next pass the second 90-degree polarization rotator 110, and the polarization directions of at least the excitation optical pulse and the signal and idler lights are rotated by 90 degrees, and become in s-polarization state. After that, these optical pulses are input to the input/output port 108-3 of the second polarization splitter/combiner 108, and are output in the s-polarization state from the input/output port 108-1.

When using the cascaded SHG/SPDC processes, the optical system which constitutes the optical interferometer 20-1 does not need to be optimized to the SHG light, and therefore it is not clear how the SHG light is polarized to output. In this case, since the wavelength component of the SHG light is finally eliminated by the optical low-pass filter 112, such an uncertain polarization state does not pose a problem. In detail, the cascaded SHG/SPDC processes are exhibited in the nonlinear optical medium 109 (PPLN crystal) by the excitation optical pulse which propagates in the clockwise direction over the optical loop, causing correlated photon pairs forming the signal and idler lights s-polarized to be output from the input/output port 108-1 of the second polarization splitter/combiner 108.

On the other hand, the s-polarized optical pulse which propagates in the counterclockwise direction over the optical loop and is output from the input/output port 108-3 passes the second 90-degree polarization rotator 110 first, and the polarization thereof is rotated by 90 degrees to convert the polarization of the optical pulse to the p-polarization. As a result, the optical pulse is input to the nonlinear optical medium 109 in the state of p-polarization, and the correlated photon pairs forming the signal and idler lights are generated by the cascaded SHG/SPDC processes. All of those excitation optical pulse, SHG light, and signal and idler lights are in the p-polarization state.

Next, the excitation optical pulse and the signal and idler lights are input to the input/output port 108-2 of the second polarization splitter/combiner 108 in the p-polarization state, and output from the input/output port 108-1 in the p-polarization state. As in the above-described case, since the SHG light is finally eliminated by the optical low-pass filter 112, an uncertain polarization state does not pose a problem. Specifically, according to the excitation optical pulse propagating in the counterclockwise direction on the optical loop, the correlated photon pairs forming the p-polarized signal and idler lights are output from the input/output port 108-1 of the second polarization splitter/combiner 108.

If optical loss in each optical component which constitutes the optical interferometer 20-1 is ignored, the intensity of the excitation optical pulse to propagate in the clockwise direction over the optical loop and input to the nonlinear optical medium 109 and the intensity of the excitation optical pulse to propagate in the counterclockwise direction and input thereto are substantially equal to each other, and the polarization directions of the pulses are also identical to each other with the pluses presented in the same position on the time axis. Such optical pulses of which intensities are equal and which are orthogonal to each other are the polarization excitation optical pulse pairs. Utilizing the polarization excitation optical pulse pairs, if the PPLN crystal which constitutes the nonlinear optical medium 109 is of a centrosymmetric structure, then the probability of generating the correlated photon pairs by the SPDC process exhibited in the PPLN crystal is identical for both of the excitation optical pulses propagating in the clockwise and counterclockwise directions.

Therefore, when the intensity of the excitation optical pulse is sufficiently low, the correlated photon pairs forming the signal and idler lights output from the input/output port 108-1 of the second polarization splitter/combiner 108 are either the s-polarized correlated photon pairs generated by the excitation optical pulse which propagates in the clockwise direction over the optical loop or the p-polarized correlated photon pairs generated by the excitation optical pulse which propagates in the counterclockwise direction over the optical loop. That is, the correlated photon pairs output from the quantum entangled photon pair generator of the present embodiment are in a superposition state of the correlated photon pairs which is caused by propagation in the clockwise direction over the optical loop and the correlated photon pairs of which the polarization is orthogonal to the above correlated photon pairs and which is based on a propagation in the counterclockwise direction over the optical loop. This means that the polarizations of two photons are parallel with each other although the polarization of each photon is not determined, and that the polarization entangled photon pairs are generated using, as the seedlight pulse, the polarization excitation optical pulse pairs having polarization planes that are orthogonal to each other.

The excitation optical pulse and the signal and idler lights, which are output from the input/output port 108-1 of the second polarization splitter/combiner 108, are input to the quantum entangled photon pair extractor 30-1. That is, these pulses are input to the input/output port 111-2 of the optical band-pass filter 111, and the signal and idler lights are output from the input/output port 111-3. Moreover, the majority (ideally, all) of the excitation optical pulse is output from the input/output port 111-1, and a residual component of the excitation optical pulse is output from the input/output port 111-3.

The output light from the input/output port 111-3 of the optical band-pass filter 111 passes the optical low-pass filter 112 first, to eliminate a component of the SHG light with the $\lambda_p/2$ and the wavelength component of the excitation light required in the SPDC process.

Next, the wavelength component ($\lambda_s$) of the signal light and the wavelength component ($\lambda_i$) of the idler light are split and output components on separate optical paths respectively, by the wavelength separation filter 113. In order to prevent an injection of a wavelength component of the residual excitation light ($\lambda_p$) on each optical path on which the wavelength component of the signal light and the wavelength component of the idler light are output, the wavelength separation filter 113 is required to have sufficient wavelength separation performance. As the wavelength separation filter 113 which fulfills such requirement, it is preferred to utilize an arrayed waveguide grating (AWG) type of wavelength division multiplexing (WDM) filter. It is also possible to employ a configuration which can sufficiently eliminate the wavelength component of the excitation light by combining a grating-type filter of which wavelength of Bragg reflection is $\lambda_p$, such as a fiber Bragg grating.

The signal and idler lights having passed through the wavelength separation filter 113 are provided for a practical use as the polarization entangled photon pairs. A state vector $|\phi\rangle$ indicating the quantum state of the polarization entangled photon pairs at that time is given by the following expression (3).

$$|\phi\rangle = \alpha |p\rangle_s |p\rangle_i + \beta e^{j\Phi} |s\rangle_s |s\rangle_i \qquad (3)$$

The polarization entangled photon pair is in superposition of orthogonal polarization quantum states $|p\rangle_s |p\rangle_i$ and $|s\rangle_s |s\rangle_i$. In the expression, j denotes an imaginary unit and $\alpha$ and $\beta$ satisfy the relation $|\alpha|^2 + |\beta|^2 = 1$.

In the expression (3), the term X in the state vector $|X\rangle Y$ is an identification label of the polarization state, where X=P represents the p-polarization and X=s represents the s-polarization, and the term Y is an identification label for identifying the signal and idler lights, where Y=s represents the signal light and Y=i represents the idler light. $|\alpha|$ and $|\beta|$ represent the probabilities of generating the photon pairs of the p-polarization and the s-polarization, respectively. Additionally, $\phi$ is a variable indicating the optical phase difference between the p-polarized photon pairs and the s-polarized photon pairs.

The maximally-entangled state, so-called Bell state, is achieved when $|\alpha| = |\beta| = \frac{1}{2}^{1/2}$ and $\phi = 0$ or $\Pi$. The relation $|\alpha| = \frac{1}{2}^{1/2}$ is satisfied when the p-polarization and s-polarization components are set equal in intensity to each other, i.e. the intensity ratio is 1:1.

Since the peak intensities of the p-polarized and s-polarized optical pulses, forming the polarization excitation optical pulse and input to the nonlinear optical medium 109, are equal to each other, the probability of generating the correlated photon pairs according to an exhibition of the SPDC process to each optical pulse is equal. Therefore, $|\alpha| = |\beta| = \frac{1}{2}^{1/2}$ is satisfied.

The optical phase difference between the correlated photon pairs p-polarized and the correlated photon pairs s-polarized, both of which constitute the polarization entangled photon pairs, is determined in accordance with the optical phase difference between the orthogonal polarization components of the excitation optical pulse with 1:1 polarization to excite, and an optical phase difference due to birefringent, a difference of the optical path lengths and so on, caused when the correlated photon pairs passes through each optical component. Since the excitation optical pulse with 1:1 polarization passes the birefringent medium 107, setting a phase difference of a total light to 0 or $\Pi$ in the birefringent medium 107 enables a setting of the value of $\phi$, which indicates the optical phase difference between the p-polarized and s-polarized photon pairs, to 0 or $\Pi$. That is, the maximally quantum entangled state is attained by setting the value of $\phi$ to 0 or $\Pi$.

(2) Operation as the Time-Bin Entangled Photon Pair Generator

Figure 3:
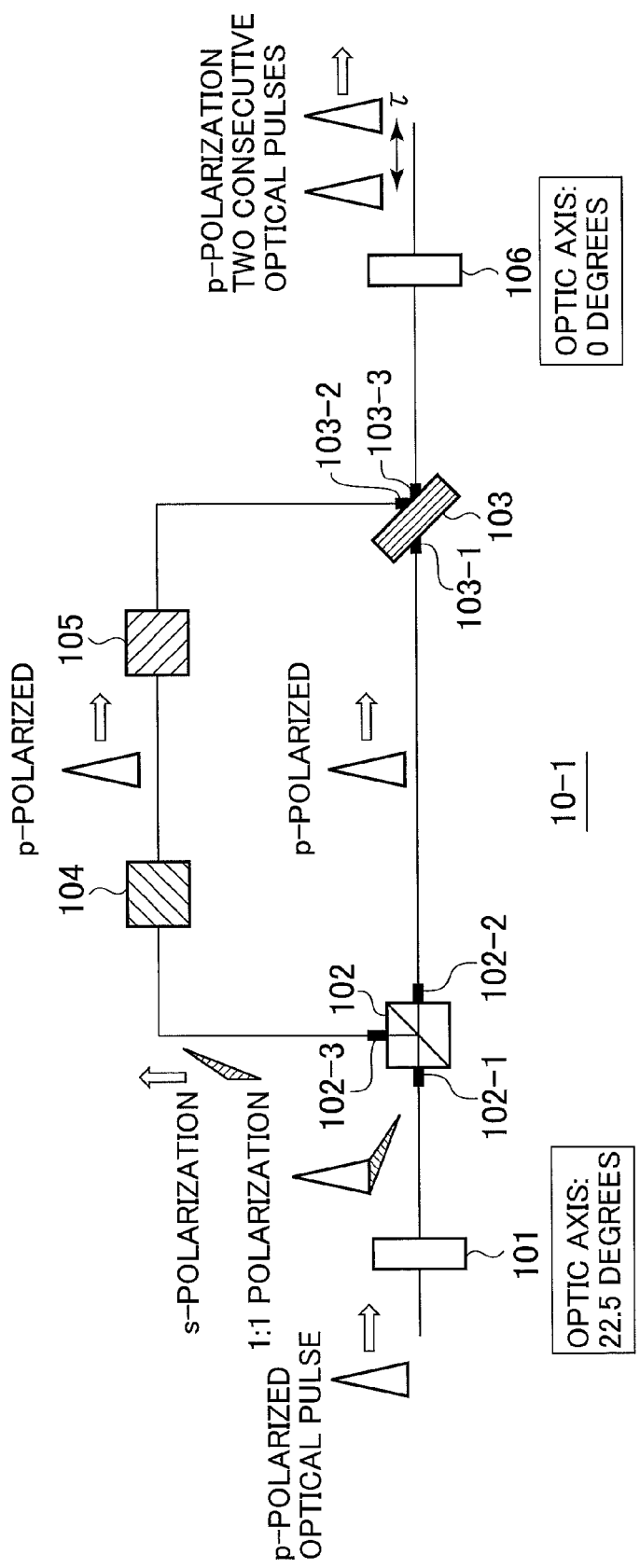
FIG. 3 is a schematic block diagram of the excitation optical pulse shaper, useful for understanding setting conditions of respective optical components of the shaper when generating time-bin entangled photon pairs.

With reference to FIGS. 1 and 3, description will be made for a case where the quantum entangled photon pair generator of the illustrative embodiment is operated as a time-bin entangled photon pair generator. FIG. 3 illustrates a schematic constitution of the excitation optical pulse shaper 10-1, and the polarization states of the optical pulses input to and output from each optical component and the setting conditions of each optical component for generating the time-bin entangled photon pairs. In the figure, the p-polarization (component) is illustrated by white isosceles triangles, and s-polarization (component) is illustrated by inclined isosceles triangles which are shaded.

As is the case of the above-described polarization entangled photon pair generation, the p-polarized optical pulse is generated using a light source and optical components, not shown, which per se may be conventional, and is input to the first half-wave plate 101. The direction of one optic axis of the first half-wave plates 101 is rotated in advance by 22.5 degrees with respect to the direction of p-polarization. The polarization plane of the optical pulse output from the first half-wave plate 101 is rotated 45 degrees with respect to the p-polarization direction, providing an output optical pulse of 45-degree polarization The optical pulse output from the first half-wave plate 101 is input to the input/output port 102-1 of the first polarization splitter/combiner 102. Then, since the input optical pulse is linearly polarized by 45 degrees, the linearly polarized optical pulse with p-polarization and the linearly polarized optical pulse with s-polarization, of which the peak intensities are equal to each other, are output from the input/output ports 102-2 and 102-3, respectively.

The optical pulse output from the input/output port 102-2 of the first polarization splitter/combiner 102 is input to the input/output port 103-1 of the half mirror 103, and is output from the input/output port 103-3 of the half mirror 103. The peak intensity of the optical pulse output from the input/output port 103-3 of the half mirror 103 becomes one half of the peak intensity of the optical pulse input to the input/output port 103-1 of the half mirror 103, but the polarization state remains in p-polarization.

On the other hand, the optical pulse output from the input/output port 102-3 of the first polarization splitter/combiner 102 has its polarization plane rotated by 90 degrees by the first 90-degree polarization rotator 104, and becomes linearly polarized optical pulse with p-polarization state. The optical pulse passes the optical delay device 105 while preserving the polarization state of the p-polarization to be input to the input/output port 103-2 of the half mirror 103, and will be output from the input/output port 103-3. The peak intensity of the optical pulse becomes one half of the peak intensity of the optical pulse input to the input/output port 103-2 at the input/output port 103-3, but the polarization state remains in the p-polarization.

As a result, the optical pulses which have propagated on two optical paths between the first polarization splitter/combiner 102 and the half mirror 103 and which are output from the input/output port 103-3 of the half mirror 103 are in p-polarization state. Additionally, since the time delay difference τ is given between the two optical paths connecting the half mirror 103 and the first polarization splitter/combiner 102, the optical pulses, which are output from the input/output port 103-3 and have the same intensity, are time-division multiplexed with a time lag τ to be two consecutive optical pulses, the two pulses appearing at different positions on the time axis.

The optical pulses output from the input/output port 103-3 are input to the second half-wave plate 106. Either of the optic axes of the second half-wave plate 106 is made to match the p-polarization direction in advance. According to a setting of the optic axis in such a manner, the optical pulses output from the second half-wave plate 106 are still linearly polarized lights with p-polarization.

The optical pulses output from the second half-wave plate 106 pass the birefringent medium 107. Each of orthogonal optic axes of the birefringent medium 107 match the directions of the p- and s-polarizations, respectively, and therefore, the polarization planes of the optical pulses are not rotated even when the pulses pass the birefringent medium 107.

As a result, the optical pulses passed the birefringent medium 107 is the two consecutive optical pulses p-polarized in which two optical pulses having identical peak intensity are located by the time lag τ. The peak intensity of each optical pulse which constitutes the two consecutive optical pulses is one fourth of the peak intensity of the p-polarized optical pulse which is input to the excitation optical pulse shaper 10-1.

As illustrated in FIG. 1, the two consecutive optical pulses (consecutive excitation optical pulse pair) output from the excitation optical pulse shaper 10-1 once pass through the quantum entangled photon pair extractor 30-1, and are input to the input/output port 108-1 of the second polarization splitter/combiner 108 included in the optical interferometer 20-1. Each optical pulse which constitutes the two consecutive optical pulses is the linearly polarized light with p-polarization, and thus those optical pulses will be output from the input/output port 108-2.

The two consecutive optical pulses, which are output from the input/output port 108-2 of the second polarization splitter/combiner 108 and propagate in the clockwise direction over the optical loop, are input to the nonlinear optical medium 109 (PPLN crystal) with unchanged p-polarization state. In the nonlinear optical medium 109, the correlated photon pairs forming the signal and idler lights are generated by the cascaded SHG/SPDC processes. All of the optical pulse (excitation optical pulse), the SHG light, and the signal and idler lights are in the p-polarization state.

As a result, as in the above-described case of generating the polarization entangled photon pair, the cascaded SHG/SPDC process is exhibited in the nonlinear optical medium 109 by the excitation optical pulse propagating in the clockwise direction on the optical loop. By this means, he correlated photon pairs forming the signal and idler lights p-polarized are generated. Then, those p-polarized optical pulses pass the second 90-degree polarization rotator 110 to be in the s-polarization state. The optical pulses are input to the input/output port 108-3 of the second polarization splitter/combiner 108, and are output from the input/output port 108-1.

In the meantime, there is no excitation light component to propagate in the counterclockwise direction over the optical looped in the operation for generating the time-bin entangled photon pair photon pairs, and thus no correlated photon pairs forming the signal and idler lights are generated based on the excitation light component propagating in the counterclockwise direction on the loop.

Since the peak intensities of respective optical pulses, forming the two consecutive optical pulses input to the nonlinear optical medium 109, are equal, the probabilities of generating the correlated photon pairs according to an exhibition of the SPDC process for optical pulses are equal.

Therefore, when the intensity of the excitation optical pulse is sufficiently low, the correlated photon pairs forming the signal and idler lights output from the input/output port 108-1 of the second polarization splitter/combiner 108 are in the superposition state of the correlated s-polarized photon pair generated by a first optical pulse forming a part of consecutive optical pulses, and the correlated photon pair generated by a second optical pulse forming part of consecutive optical pulses. This means that there are two time slots in which photons might exist, and two photons certainly exist in the identical time slot although it is not determined in which time slot each respective photon exists. Furthermore, this means that the time-bin entangled photon pairs are generated using, as the seedlight pulse, the consecutive excitation optical pulse pair in which linearly polarized optical pulses with the same polarization appear at different positions on the time axis.

The operation in the quantum entangled photon pair extractor 30-1 which extracts only the time-bin entangled photon pairs from the output light which is output from the input/output port 108-1 of the second polarization splitter/combiner 108 is the same as the above-described case of polarization entangled photon pair generation. Therefore, redundant description is omitted.

A state vector $|\phi\rangle$ indicating the quantum state of the correlated photon pairs forming the signal and idler lights output from the quantum entangled photon pair extractor 30-1 is given by the following expression (4).

$$|\phi\rangle = \alpha |1\rangle_s |1\rangle_i + \beta e^{j\phi} |2\rangle_s |2\rangle_i \quad (4)$$

The time-bin entangled photon pairs are in superposition of time-bin quantum states $|1\rangle_s|1\rangle_i$ and $|2\rangle_s|2\rangle_i$.

In the expression (4), the term X in the state vector $|X\rangle Y$ is an identification label of the time slot, where X=1 represents the first time slot, and X=2 represents the second time slot. Moreover, the term Y is an identification label for identifying the signal and idler lights, where Y=s represents the signal light and Y=i represents the idler light. $|\alpha|$ and $|\beta|$ represent the probability that a photon pair will occur in the first time slot, and the probability that a photon pair will occur in the second time slot, respectively. Moreover, $\phi$ is a variable indicating the optical phase difference between the photon pairs in the first time slot and the photon pairs in the second time slot. A maximally-entangled state is achieved when $|\alpha|=|\beta|=\frac{1}{2}^{1/2}$ and $\phi=0$ or $\Pi$.

Since the peak intensities of respective optical pulses forming the two consecutive optical pulses input to the nonlinear optical medium 109 are substantially equal to each other, the probabilities of generating the correlated photon pairs according to an exhibition of the SPDC process for optical pulses are equal. Therefore, the relationship $|\alpha|=|\beta|=\frac{1}{2}^{1/2}$ is satisfied.

The optical phase difference between the correlated photon pairs generated by a first optical pulse forming part of the two consecutive optical pulses and the correlated photon pairs generated by a second optical pulse forming part of the two consecutive optical pulses is determined in accordance with an optical phase difference between first and second excitation optical pulses which form the two consecutive optical pulses, and an optical phase difference due to birefringent, a difference in optical path lengths and so on caused when the correlated photon pairs passes through each optical component. Since the second excitation optical pulse of the two consecutive optical pulses passes the optical delay device 105, setting a phase difference of the total light to 0 or $\phi$ in the optical delay device 105 enables a setting of the value of $\phi$, which indicates the optical phase difference between the photon pair in a first time slot and the photon pair in a second time slot, to 0 or $\phi$. That is, the maximally quantum entangled state is accomplished by setting the value of $\phi$ to 0 or $\phi$.

In summary, according to the quantum entangled photon pair generator of the instant illustrative embodiment, when the generator operates as a polarization entangled photon pair generator, the direction of one optic axis of the first half-wave plates 101 is made to match the p-polarization direction, and one optic axis direction of the second half-wave plate 106 is rotated in advance by 22.5 degrees with respect to the p-polarization direction.

By contrast, when the generator operates as a time-bin entangled photon pair generator, the direction of one optic axis of the first half-wave plates 101 is rotated in advance by 22.5 degrees with respect to the p-polarization direction, and one optic axis direction of the second half-wave plate 106 is made to match the p-polarization direction.

In this manner, with a simple operation of rotating the optic axes of the first and second half-wave plates 101 and 106, the generator can selectively serve as a polarization entangled photon pair generator and as a time-bin entangled photon pair generator. In other words, when the quantum entangled photon pair generator is utilized for quantum cryptography, quantum information and communication systems such as quantum computers and so on, it is possible to selectively generate required quantum entangled photon pairs in either format of the polarization entangled photon pairs and the time-bin entangled photon pairs, by a single quantum entangled photon pair generator.

The quantum entangled photon pair generator of the invention may not be limited to the configuration example illustrated in FIG. 1, but modifications can be made which operate similarly. A first modification addresses a constitution of a quantum entangled photon pair extractor.

Figure 4:
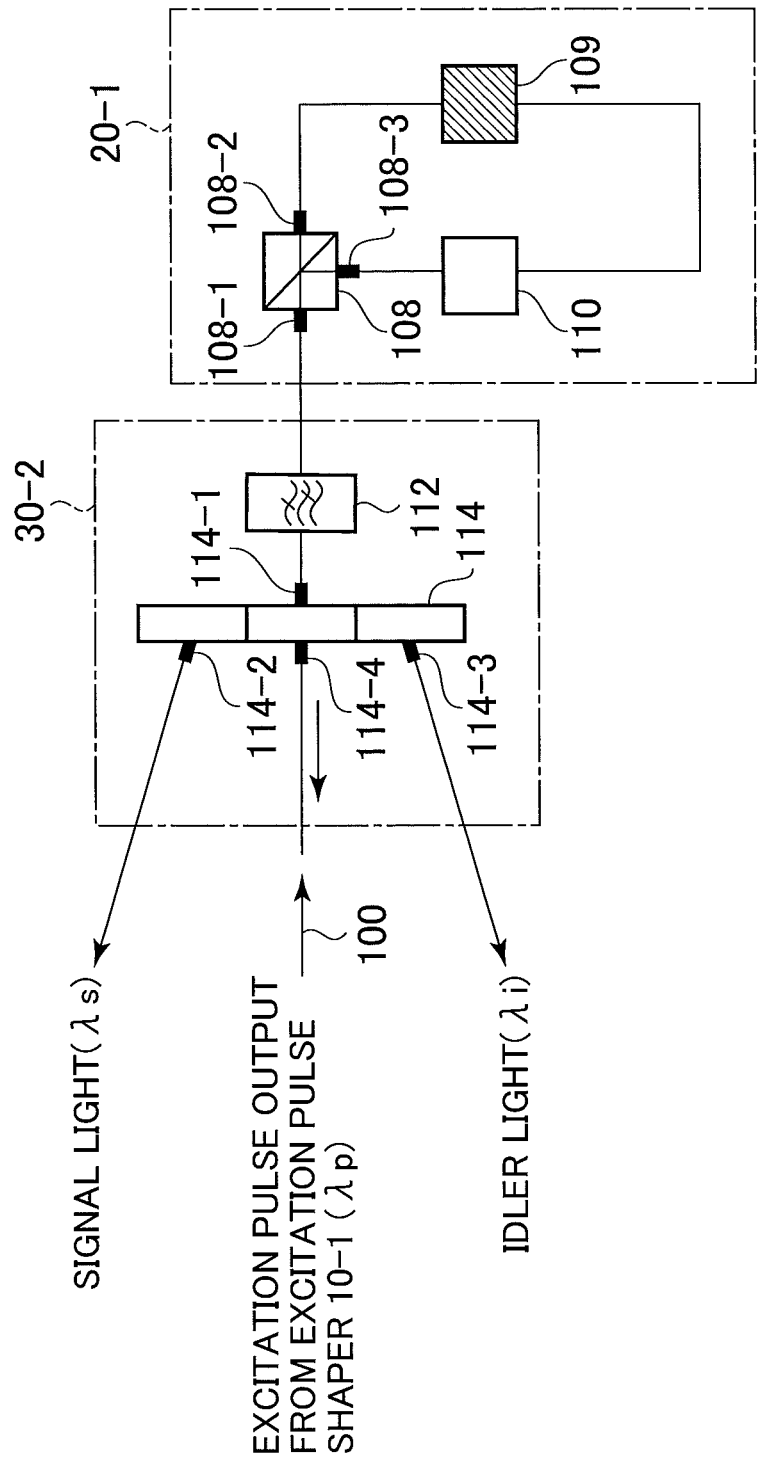
FIGS. 4, 5 and 6 are schematic block diagrams respectively showing a first, a second and a third modification, respectively, of the quantum entangled photon pair generator according to the illustrative embodiment shown in FIG. 1.

With reference to FIG. 4, the first modification will be described. In the first modification, the functions of the optical band-pass filter 111 and the wavelength separation filter 113 illustrated in FIG. 1 are implemented by a wavelength separation filter 114. More specifically, in the first modification, the constitution of the quantum entangled photon pair extractor is different from the above-described constitution. Since the constitution of the excitation optical pulse shaper 10-1 may be the same as the above-described configuration example illustrated in FIG. 1, illustration of the excitation optical pulse shaper 10-1 is omitted from FIG. 4. FIG. 4 illustrates a quantum entangled photon pair extractor 30-2 and the optical interferometer 20-1 according to the first modification.

The quantum entangled photon pair extractor 30-2 of the first modification includes a wavelength separation filter 114 and the optical low-pass filter 112. The wavelength separation filter 114 has its transmission wavelengths corresponding to the wavelengths of the excitation optical pulse (polarization excitation optical pulse pair or consecutive excitation optical pulse pair) output from the excitation optical pulse shaper 10-1 and the signal and idler lights. The wavelength separation filter 114 has its common input/output port 114-1 and plural, three in this example, transmission input/output ports 114-2, 114-3 and 114-4. The optical low-pass filter 112 eliminates wavelength components other than the wavelength components corresponding to the correlated photon pairs.

The excitation optical pulse which is the output light from the excitation optical pulse shaper 10-1 is input to either of the plurality of transmission light input/output ports of the wavelength separation filter 114, in this modification to the fourth input/output port 114-4. The excitation optical pulse passes through the wavelength separation filter 114 to output from the common input/output port 114-1, and input to an optical loop through the optical low-pass filter 112. In addition, the signal light and idler light, which are output from the optical loop, are input to the common input/output port 114-1 of the wavelength separation filter 114. The signal and idler lights are split and output from the transmission light input/output ports of the wavelength separation filter 114, in this modification from the ports 114-2 and 114-3.

Also in the first modification, as the wavelength separation filter 114, an AWG type WDM filter is used which has its transmission wavelengths corresponding to at least three wavelengths of a signal light wavelength ($\lambda_s$), an idler light wavelength ($\lambda_i$) and an excitation light wavelength ($\lambda_p$). The wavelength separation filter 114 has its plural, three in this example, transmission light input/output ports 114-2, 114-3 and 114-4 receiving the lights with the wavelengths corresponding to the transmission wavelengths, and its common input/output port 114-1 for combining those lights input to respective transmission light input/output ports 114-2, 114-3 and 114-4 to develop the combined light By contrast, the light input to the common input/output port 114-1 is divided by the wavelength separation filter 114 according to its wavelength to be output as a corresponding divided light from appropriate one of the transmission light input/output ports 114-2, 114-3 and 114-4 for the transmission wavelength.

The excitation optical pulse output from the excitation optical pulse shaper 10-1, not shown in FIG. 4, is input to the transmission light input/output port 114-4. The output light from the common input/output port 114-1 is input to the input/output port 108-1 of the second polarization splitter/combiner 108. Then, the excitation optical pulse, which is input to the input/output port 108-1, is input to the nonlinear optical medium 109 arranged on the optical path of the optical loop of the optical interferometer 20-1, from both directions in the case of the polarization entangled photon pair generation, or from a single direction in the case of the time-bin entangled photon pair photon pair generation.

The output light of the optical loop, which is output from the input/output port 108-1 of the second polarization splitter/combiner 108, is input to the common input/output port 114-1 of the wavelength separation filter 114. The signal and idler lights are output, respectively, from the transmission light input/output ports 114-2 and 114-3 corresponding thereto. For example, the signal light is output from the transmission light input/output port 114-2, and the idler light is output from the transmission light input/output port 114-3. The wavelength component corresponding to the excitation light wavelength is eliminated in this stage. Furthermore, in order to eliminate short wavelength components, such as the SHG light, the optical low-pass filter 112 may be arranged between the common input/output port 114-1 of the wavelength separation filter 114 and the input/output port 108-1 of the second polarization splitter/combiner 108, if necessary. By this means, the wavelength component of the SHG light is eliminated.

Figure 5:
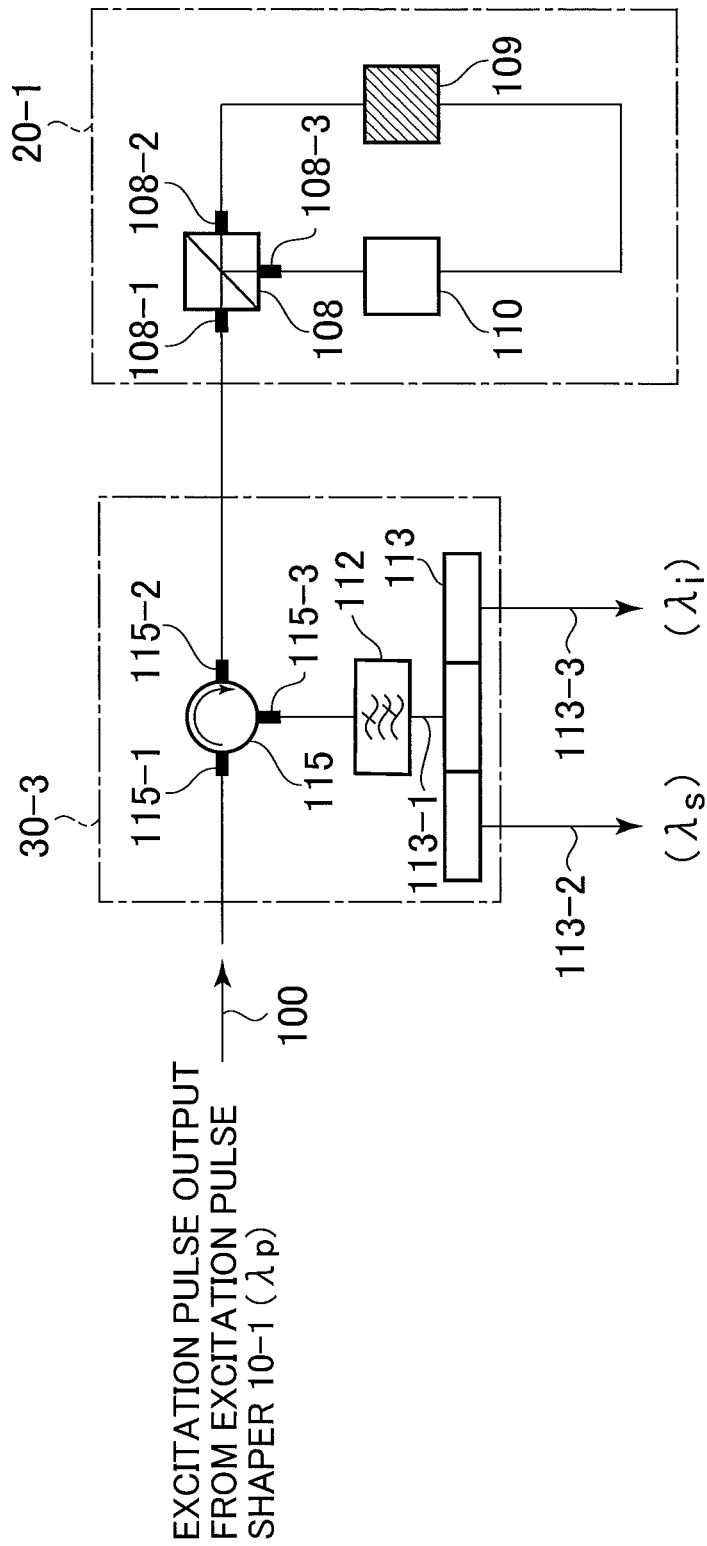

With reference to FIG. 5, a second modification will be described. The second modification also addresses the constitution of the quantum entangled photon pair extractor. In the second modification, an optical circulator 115 is used instead of the optical band-pass filter 111. A quantum entangled photon pair extractor 30-3 according to the second modification includes the optical circulator 115 having its three input/output ports 115-1, 115-2 and 115-3, and includes the optical low-pass filter 112 and the wavelength separation filter 113.

The excitation optical pulse output from the excitation optical pulse shaper 10-1, not shown in FIG. 5, is input to the input/output port 115-1 of the optical circulator 115. The excitation optical pulse input to the input/output port 115-1 is output from the input/output port 115-2, and then is input to the input/output port 108-1 of the second polarization splitter/combiner 108. As is the case with the constitution illustrated in FIG. 1, the pulse is input to the nonlinear optical medium 109, from both directions in the case of the polarization entangled photon pair generation, or from a single direction in the case of the time-bin entangled photon pair generation.

The output light of the optical loop which is output from the input/output port 108-1 of the second polarization splitter/combiner 108 is input to the input/output port 115-2 of the optical circulator 115, and is output from the input/output port 115-3. After having output from the input/output port 115-3, the light output passes the optical low-pass filter 112 and the wavelength separation filter 113 to thereby eliminate short wavelength components, such as the SHG light, and the wavelength components corresponding to the signal and idler lights 113-2 and 113-3 are spatially separated to output.

More specifically, the optical low-pass filter 112 eliminates the wavelength components other than the wavelength components corresponding to the correlated photon pairs from the output light which is output from the input/output port 115-3. The wavelength separation filter 113 splits the output light 113-1 from the optical low-pass filter 112 into the signal and idler lights 113-2 and 113-3 which form the quantum entangled photon pairs, and output the lights on the separate optical paths 113-2 and 113-3.

Now, with reference to FIG. 6, a third modification will be described. In the third modification, the birefringent medium 107 provided in the excitation optical pulse shaper 10-1 of the quantum entangled photon pair generator illustrated in FIG. 1 is removed, and an optical phase bias circuit 201 which has a function of the birefringent medium 107 is arranged instead of the second 90-degree polarization rotator 110 provided in the optical interferometer 20-1. That is, a quantum entangled photon pair generator according to third modification includes an excitation optical pulse shaper 10-2, an optical interferometer 20-2, and the quantum entangled photon pair extractor 30-1. The remaining components may be the same as the above-described examples, and therefore repetitive description thereon is omitted.

The excitation optical pulse shaper 10-2 includes the first half-wave plate 101, the first polarization splitter/combiner 102, the half mirror 103, the first 90-degree polarization rotator 104, the optical delay device 105 and the second half-wave plate 106. The functions of those components may be the same as the above-described excitation optical pulse shaper 10-1.

The optical interferometer 20-2 is constituted as a Sagnac interferometer type of optical loop in which the optical path has its input/output ends connected by the second polarization splitter/combiner 108 to form an optical loop path. The nonlinear optical medium 109 and the optical phase bias circuit 201 are arranged on the optical loop.

Figure 7:
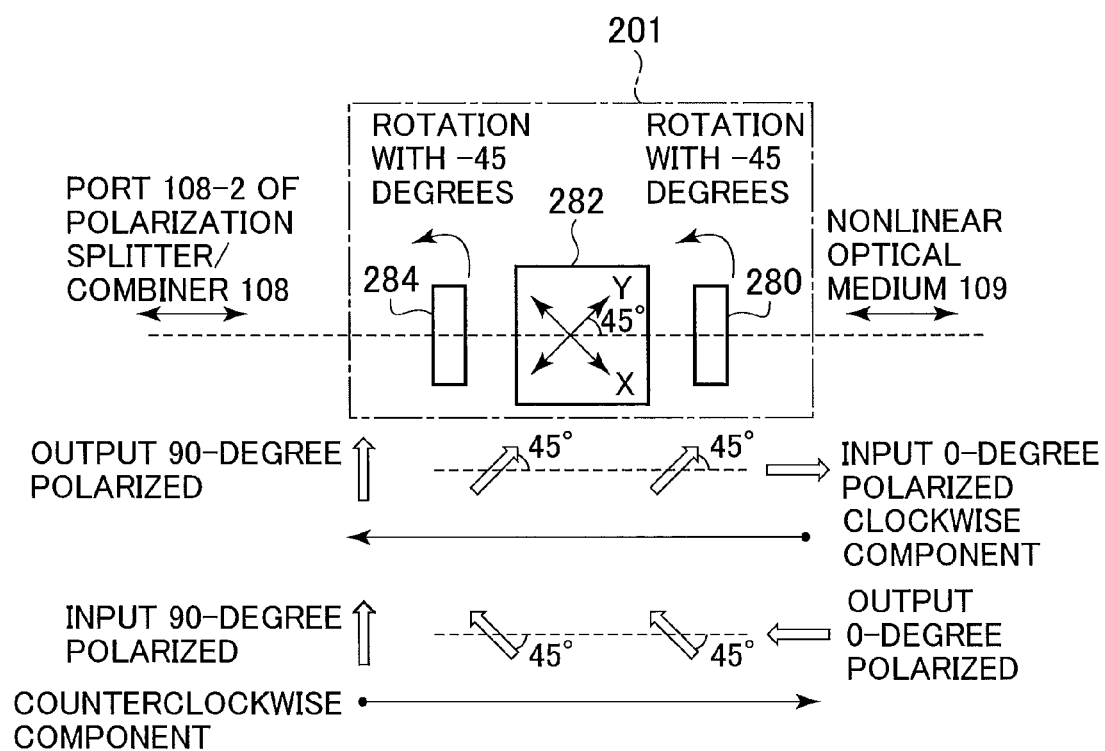
FIG. 7 is an explanatory view for use in describing the operations of an optical phase bias circuit.

With reference to FIG. 7, the operation of the optical phase bias circuit 201 will be described. The nonlinear optical medium 109 generates the correlated photon pairs through the parametric fluorescence process. The optical phase bias circuit 201 is formed by arranging in series a first Faraday rotator 280 which rotates the polarization plane of a linearly polarized light by −45 degrees, a birefringent medium 282 which has its optic axes X and Y, and a second Faraday rotator 284 which rotates the polarization plane of the linearly polarized light by −45 degrees, in this order.

First, description will be made on how the polarization state of the optical pulse changes when the p-polarized optical pulse is input from the first Faraday rotator 280 side, which may be referred to as right side, and is output from the second Faraday rotator 284 side, which may be referred to as left side. The polarization direction of the p-polarized optical pulse input from the right side is rotated by −45 degrees by passing the first Faraday rotator 280. The birefringent medium 282 is arranged so that the polarization direction after the polarization rotation matches the direction of one optic axis, Y-axis in FIG. 7, of the birefringent medium 282. The optical pulse input to the birefringent medium 282 passes the birefringent medium 282 as the linearly polarized light which has a polarization plane parallel to the Y-axis thereof, and is input to the second Faraday rotator 284. Then, the polarization direction of the optical pulse is rotated by −45 degrees by passing the second Faraday rotator 284. As a result, the optical pulse output from the second Faraday rotator 284 becomes an s-polarized optical pulse, and is output from the optical phase bias circuit 201. Then, the optical pulse is input to the input/output port 108-3 of the second polarization splitter/combiner 108.

Next, it will be described how the polarization state of the optical pulse changes when the s-polarized optical pulse is input from the left side of the optical phase bias circuit 201 and is output from the right side thereof. The polarization direction of the s-polarized optical pulse input from the left side is rotated by −45 degrees by passing the second Faraday rotator 284. The polarization direction after the polarization rotation matches the direction of the X-axis which is one optic axis of the birefringent medium 282. Hence, the optical pulse input to the birefringent medium 282 passes the birefringent medium 282 as a linearly polarized light which has a polarization plane parallel to the X-axis, and inputs to the first Faraday rotator 280. Then, the polarization direction of the optical pulse rotates is rotated by −45 degrees by passing the first Faraday rotator 280. As a result, the optical pulse output from the first Faraday rotator 280 becomes a p-polarize optical pulse, and is output from the optical phase bias circuit 201 to input to the nonlinear optical medium 109.

More specifically, regardless of a direction from which the pulse inputs to the optical phase bias circuit 201, the polarization plane of the optical pulse is rotated by 90 degrees, and the optical pulse is output from the optical phase bias circuit 201. The polarization state of the input/output optical pulse may be set so that a p-polarized optical pulse is input from the right side of the optical phase bias circuit 201 and the s-polarized optical pulse is output from the left side thereof, and an s-polarized optical pulse is input from the left side thereof and the p-polarized optical pulse is output from the right side thereof. By this means, the optical pulses input from the right and left sides pass the birefringent medium 282 in the state of linearly polarized light having a polarization plane parallel to either of the optic axes, X- or Y-axis, the optic axes being orthogonal to each other. Therefore, the optical phase difference is given based on the birefringent of the birefringent medium 282 between the optical pulses input from the right and left sides.

Conversely, the polarization state of the input/output optical pulse may be set so that the p-polarized optical pulse is input from the left side of the optical phase bias circuit 201 and the s-polarized optical pulse is output from the right side thereof, and the s-polarized optical pulse is input from the right side thereof and the p-polarized optical pulse is output from the left side thereof. By this means, the optical pulses input from the right and left sides pass the birefringent medium 282 in the state of linearly polarized light having a polarization plane parallel to either of the optic axes, X-axis or Y-axis, the optic axes being orthogonal to each other. Accordingly, the optical phase difference is given based on the birefringent of the birefringent medium 282 between the optical pulses input from the left and right sides.

As described above, the optical phase bias circuit 201 serves as the birefringent medium 107 and the second 90-degree polarization rotator 110 in the quantum entangled photon pair generator illustrated in FIG. 1. Therefore, the quantum entangled photon pair generator shown in FIG. 6 presents similar effects as the quantum entangled photon pair generator illustrated in FIG. 1.

The description has been made assuming the case where the PPLN crystal is used as the nonlinear optical medium 109. However, except the PPLN crystal, a bulk crystal or the like can be used as a medium which exhibits the second-order nonlinear optical effect. In addition, an optical fiber or the like which exhibits the third-order nonlinear optical effect can be used. Furthermore, an SPDC process, an SFWM process or the like can be used as the parametric fluorescence process, other than the cascaded SHG/SPDC processes.

Figure 6:
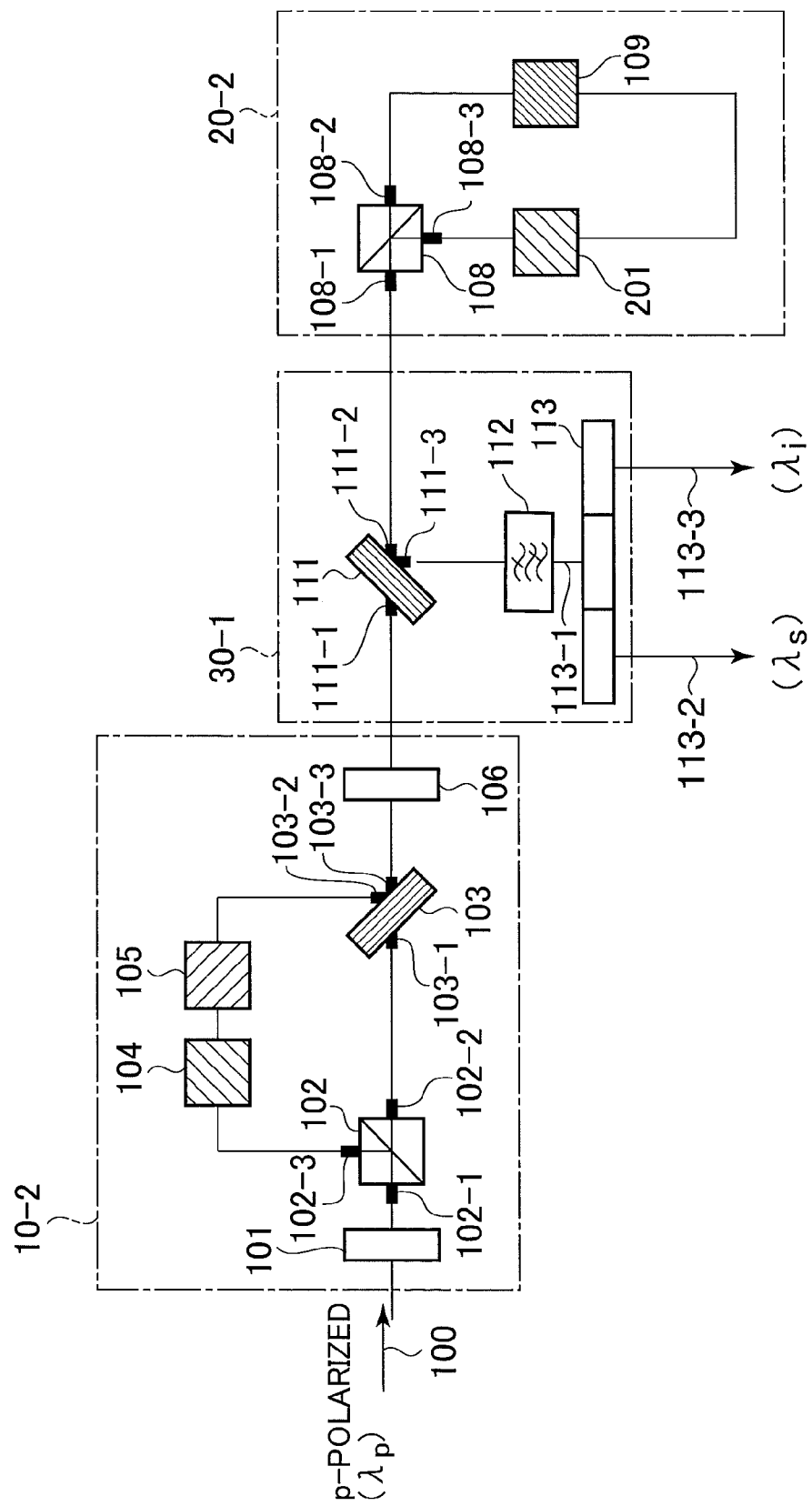

The location of the first 90-degree polarization rotator 104 and optical phase bias circuit 201 and the like to the nonlinear optical medium 109 on the optical path of the optical loop may not be limited to the arrangement illustrated in FIG. 6. For example, in cases where $d_{11}$ component is used as a tensor component of the second-order nonlinear optical constant of the PPLN crystal which constitutes the nonlinear optical medium 109, the first 90-degree polarization rotator 104 may be located on the optical path which connects the input/output port 102-2 of the first polarization splitter/combiner 102 and the input/output port 103-1 of the half mirror 103.

The positions of the first 90-degree polarization rotator 104 and the optical phase bias circuit 201 may be replaced with each other from the positions illustrated in FIG. 6. More specifically, the optical phase bias circuit 201 may be located in the position of the first 90-degree polarization rotator 104 shown in FIG. 6, and the first 90-degree polarization rotator 104 may be located in the position of the optical phase bias circuit 201 shown in FIG. 6.

Such a location of those components can be determined in view of the direction of the optic axis of the nonlinear optical medium 109, optical components constituting the optical phase bias circuit 201, or the first 90-degree polarization rotator 104, and the polarization directions of the optical pulses input to those components.

Well, with reference to FIG. 8, a constitution of a quantum entangled photon pair generator according to an alternative embodiment will be described. In order to clarify corresponding positions between FIG. 8 and FIGS. 9 and 10, with which reference will be made later on, points "A", "B" and "C" are depicted on the optical path shown in FIGS. 8, 9 and 10. The second quantum entangled photon pair generator includes the excitation optical pulse shaper 10-2 and a quantum entangled photon pair generation and an extractor 40. The excitation optical pulse shaper 10-2 may be the same as the excitation optical pulse shaper 10-2 of the above-described quantum entangled photon pair generator according to the third modification, and hence a repetitive description of the constitution and operation thereof is omitted.

Figure 8:
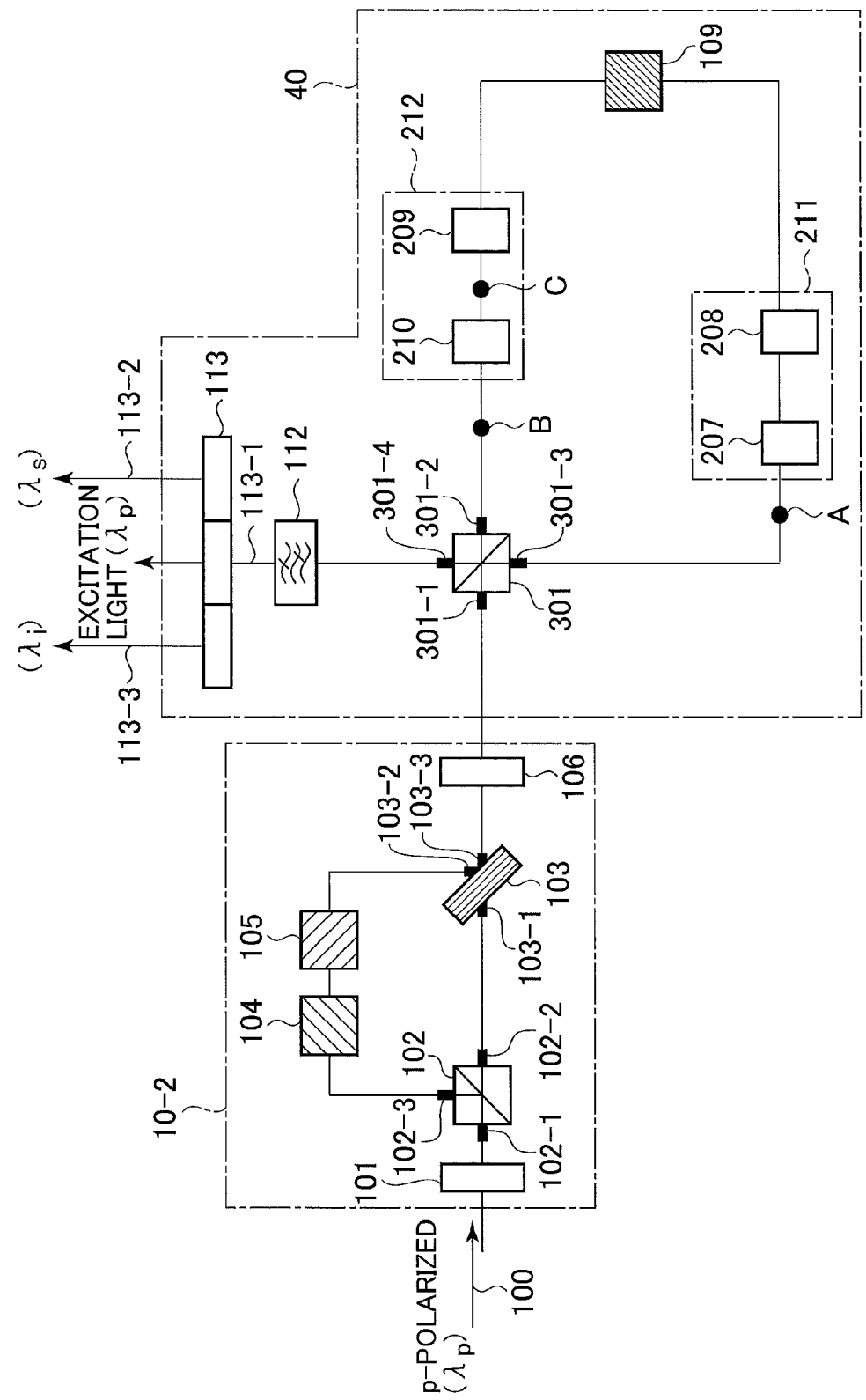
FIG. 8 is a schematic block diagram of a quantum entangled photon pair generator according to an alternative embodiment of the present invention.

As seen from FIG. 8, the quantum entangled photon pair generator and extractor 40 includes a polarization splitter/combiner 301 having its four input/output ports 301-1 through 301-4. The excitation optical pulse 301-1 output from the excitation optical pulse shaper 10-2 is input to the input/output port 301-1 of the polarization splitter/combiner 301. The correlated photon pairs generated using the excitation optical pulse 301-1 as the seedlight pulse are output from the input/output port 301-4.

In order to implement such a constitution, in place of the above-described second 90-degree polarization rotator 110, two pairs of optical components including a Faraday rotator and a half-wave plate are used to form nonreciprocal polarization converters. Additionally, in place of the second polarization splitter/combiner 108 which constitutes the above-described optical interferometer 20-1 and 20-2, the above-described polarization splitter/combiner 301 is used which include the four input/output ports 301-1 through 301-4.

It is to be noted that, in the quantum entangled photon pair generator of the alternative embodiment, only the cascaded SHG/SPDC processes or the SFWM process are applicable as the parametric fluorescence process.

The quantum entangled photon pair generator and extractor 40 receives the polarization excitation optical pulse pair or the consecutive excitation optical pulse pair. The quantum entangled photon pair generator and extractor 40 generates the correlated photon pairs forming the signal and idler lights through the parametric fluorescence process. The quantum entangled photon pair generator and extractor 40 selectively extracts the wavelength components corresponding to the signal and idler lights, and outputs the extracted components as the polarization entangled photon pairs or the time-bin entangled photon pairs.

The quantum entangled photon pair generator and extractor 40 includes a Sagnac interferometer type optical loop which has its optical path formed in a loop, the optical low-pass filter 112, and the wavelength separation filter 113. On the optical loop path, there are arranged a first and a second nonreciprocal polarization converter 211 and 212, and the nonlinear optical medium 109. The optical loop is completed by the polarization splitter/combiner 301 having its input/output ports 301-2 and 301-3 connecting the input/output ends of the optical path.

The optical low-pass filter 112 eliminates wavelength components other than the wavelength components corresponding to the correlated photon pairs forming the signal and idler lights, which are generated based on the parametric fluorescence process in the nonlinear optical medium 109 arranged on the optical path loop. The wavelength separation filter 113 splits the output light 113-1 from the optical low-pass filter 112 into the signal and idler lights 113-2 and 113-3 to output the lights on the respective, separate optical paths 113-2 and 113-3.

Figure 9:
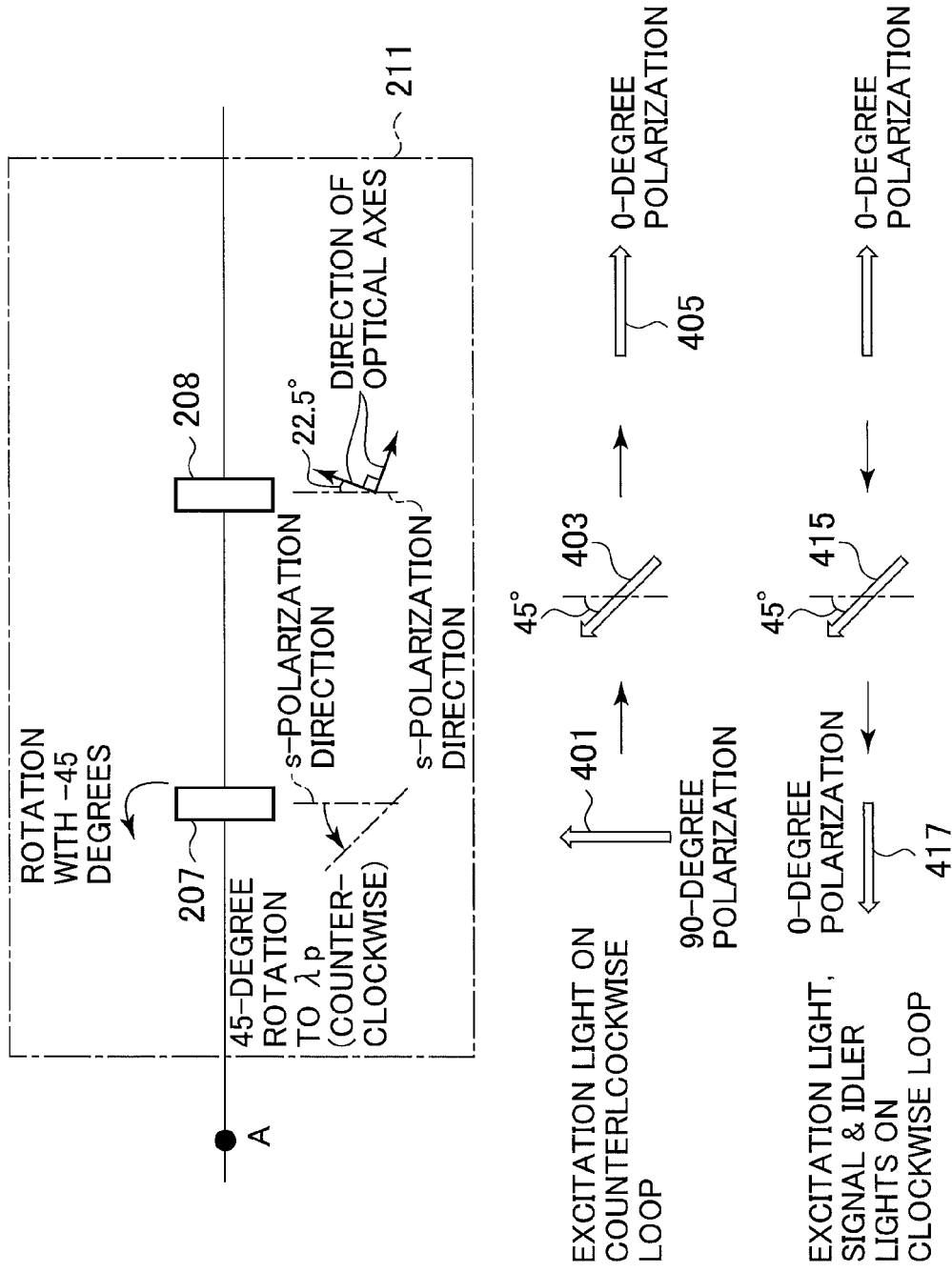
FIG. 9 schematically shows the first nonreciprocal polarization converter shown in FIG. 8, useful for understanding how the polarization states of optical pulses change when passing through the converter.
Figure 10:
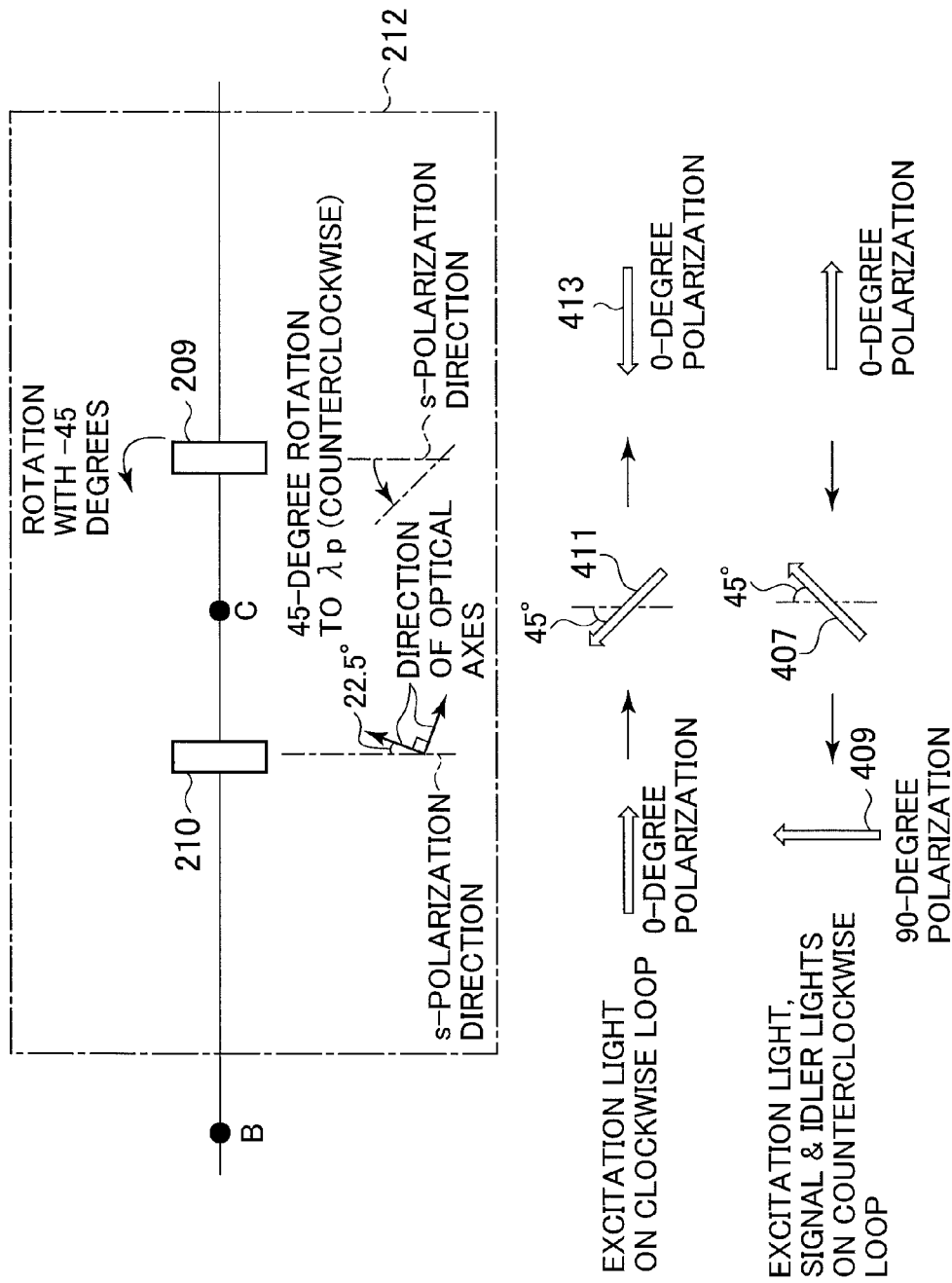
FIG. 10 schematically shows the second nonreciprocal polarization converter shown in FIG. 8, useful for understanding how the polarization states of optical pulses change when passing through the converter.

The first and second nonreciprocal polarization converters 211 and 212 which are arranged in the optical loop may be of the same structure. The structures of the first and second nonreciprocal polarization converters 211 and 212 will be described with reference to FIGS. 9 and 10, respectively. The optic axes of the first and second half-wave plates 208 and 210 are as illustrated in FIGS. 9 and 10, respectively.

The first nonreciprocal polarization converter 211 is formed by a combination of a first Faraday rotator 207 and a first half-wave plate 208. The second nonreciprocal polarization converter 212 is formed by a combination of a second Faraday rotator 209 and a second half-wave plate 210.

The first and second Faraday rotators 207 and 209 rotate the polarization plane by −45 degrees in counterclockwise direction, to the excitation optical pulse of which the wavelength is in the vicinity of $\lambda_p$ and the signal and idler lights. The first and second Faraday rotators 207 and 209 may be the same as the first and second Faraday rotators 280 and 284) which are utilized in the quantum entangled photon pair generator according to the first modification described with reference to FIGS. 6 and 7.

Moreover, the first and second half-wave plates 208 and 210 operates as half-wave plates to the excitation optical pulse of which the wavelength is in the vicinity of $\lambda_p$ and the signal and idler lights, as is the case with the first and second half-wave plates 101 and 106 which are utilized in the quantum entangled photon pair generator of the illustrative embodiment described with reference to FIG. 1.

The function and its role of each of the input/output ports 301-1, 301-2 and 301-3 of the polarization splitter/combiner 301 may be the same as the input/output ports 108-1, 108-2 and 108-3 of the second polarization splitter/combiner 108 which is included in the quantum entangled photon pair generator according to the illustrative embodiment described earlier. The excitation optical pulse output from the excitation optical pulse shaper 10-2 is input to the input/output port 301-1 of the polarization splitter/combiner 301.

More specifically, the p-polarized component of the excitation optical pulse input to the input/output port 301-1 is output from the input/output port 301-2, and the s-polarized component input to the input/output port 301-1 is output from the input/output port 301-3. The p-polarized component input to the input/output port 301-2 is output from the input/output port 301-1, and the s-polarized component input to the input/output port 301-3 is output from the input/output port 301-1. In the polarization splitter/combiner 301, the s-polarized component input to the input/output port 301-2 is output from the input/output port 301-4, and the p-polarized component input to the input/output port 301-3 is output from the input/output port 301-4.

As the polarization splitter/combiner 301, for example, appropriate one selected from commercially available polarization beam splitters can be used. In addition, as for the optical components which fulfill the role in common with optical components of earlier-described quantum entangled photon pair generator, the repetitive description is omitted.

Operation will be described below. As is the case with the earlier-described quantum entangled photon pair generator, the excitation optical pulse with wavelength $\lambda_p$ output from the excitation optical pulse shaper 10-2 is input to the input/output port 301-1 of the polarization splitter/combiner 301, and the p-polarized and s-polarized components are output from the input/output ports 301-2 and 301-3, respectively. The s-polarized excitation optical pulse, output from the input/output port 301-3 and propagating in the counterclockwise direction over the optical looped, passes the first nonreciprocal polarization converter 211 including the first Faraday rotator 207 and the first half-wave plate 208. It is illustrated in the middle of FIG. 9 how the polarization state of the excitation optical pulse changes in passage through the first nonreciprocal polarization converter 211. In FIG. 9, the s-polarized excitation optical pulse is depicted by an upward arrow 401, the excitation optical pulse being output from the input/output port 301-3 of the polarization splitter/combiner 301.

As is clear from FIG. 9, in the first nonreciprocal polarization converter 211, the linearly polarized excitation optical pulse with a specific polarization direction is input from the first Faraday rotator 207 side or the first half-wave plate 208 side. The specific polarization direction indicates either the p-polarized direction or the s-polarized direction in the polarization splitter/combiner 301. The optic axis of the first half-wave plate 208 is adjusted so that the optic axis forms 22.5 degrees with respect to the specific polarization direction, i.e. s-polarized direction in FIG. 9.

The s-polarized excitation optical pulse output from the input/output port 301-3 passes the first Faraday rotator 207. The polarization plane is rotated by 45 degrees in the counterclockwise direction in the figure by the first Faraday rotator 207. The polarization direction of the output light from the first Faraday rotator 207 is designated by an arrow 403 pointing upper-left with 45 degrees.

Next, the output light from the first Faraday rotator 207 passes the first half-wave plate 208. The polarization direction at this time forms 22.5 degrees with respect to the optic axis of the first half-wave plate 208, and therefore the polarization direction of the excitation optical pulse output from the first half-wave plate 208 can be depicted by a rightward arrow 405. This means that the polarization direction of the excitation optical pulse output from the first half-wave plate 208 is a p-polarized direction. Accordingly, this means that, when the excitation optical pulse which has passed the first Faraday rotator 207 and the first half-wave plate 208 in the first nonreciprocal polarization converter 211 in this order, the polarization plane of the pulse is rotated by 90 degrees.

The excitation optical pulse output from the first nonreciprocal polarization converter 211 is input to the nonlinear optical medium 109, and the SHG light and correlated photon pairs forming the signal and idler lights are generated therein, the polarization state of the lights being the same as the polarization state (in this case, p-polarized state) of the excitation optical pulse. The excitation optical pulse, the SHG light, and the correlated photon pairs propagating in the counterclockwise direction over the optical loop are input to the second nonreciprocal polarization converter 212. It is illustrated in the lower part of FIG. 10 how to change the polarization state of the excitation optical pulse, SHG light and correlated photon pairs in the second nonreciprocal polarization converter 212.

When the p-polarized excitation optical pulse and correlated photon pairs pass the second Faraday rotator 209, polarizations thereof are rotated by 45 degrees in the counterclockwise direction in FIG. 10 and become a polarization state illustrated by an arrow 407 pointing upper-right with 45 degrees. Then, the output light from the second Faraday rotator 209 passes the second half-wave plate 210, and the polarization direction of the light is illustrated by an upward arrow 409, that is, with 90-degree polarization.

The excitation optical pulse and the correlated photon pairs, which are output from the second half-wave plate 210, are input to the input/output port 301-2 of the polarization splitter/combiner 301, and are output from the input/output port 301-4 since the polarization state is in the 90-degree polarization. Accordingly, the excitation optical pulse and the correlated photon pairs are output from the input/output port 301-4, which is a different input/output port from the input/output port 301-1 to which the output light output from the excitation optical pulse shaper 10-2 is input.

Next, described will be the p-polarized excitation optical pulse and the correlated photon pairs generated using the excitation optical pulse as the seedlight pulse. The p-polarized excitation optical pulse is output from the input/output port 301-2 of the polarization splitter/combiner 301, and is propagated in the clockwise direction over the optical loop.

The excitation optical pulse output from the input/output port 301-2 is input to the second nonreciprocal polarization converter 212, and passes therethrough. The changes in the polarization state of the excitation optical pulse in passage of the second nonreciprocal polarization converter 212 are illustrated in the middle part of FIG. 10.

The excitation optical pulse, which is output from the input/output port 301-2 of the polarization splitter/combiner 301 and is input to the second nonreciprocal polarization converter 212 in the p-polarized state, is converted to the polarization state illustrated by an arrow 411 pointing upper-left with 45 degrees in FIG. 10 by passing the second half-wave plate 210. The excitation optical pulse output from the second half-wave plate 210 has its polarization rotated by 45 degrees in the counterclockwise direction in the figure by passing the second Faraday rotator 209. As a result, the polarization state of the pulse becomes in a state illustrated by a leftward arrow 413 in FIG. 10, that is, a p-polarized state, and the pulse is output from the second nonreciprocal polarization converter 212.

The excitation optical pulse output from the second nonreciprocal polarization converter 212 is input to the nonlinear optical medium 109 in the form of p-polarized excitation optical pulse. As a result, the SHG light and the correlated photon pairs are generated, the polarization states of which are the same as the excitation optical pulse, namely p-polarized.

The excitation optical pulse, the SHG light and the correlated photon pairs, which are output from the nonlinear optical medium 109 and are propagated in the clockwise direction over the optical loop, are input to the first nonreciprocal polarization converter 211. The changes of the polarization state of the excitation optical pulse, the SHG light and the correlated photon pairs in passage through the first nonreciprocal polarization converter 211 are illustrated in the lower part of FIG. 9.

The excitation optical pulse and the correlated photon pairs which are in the p-polarized state are converted to the polarization state illustrated by an arrow 415, FIG. 9, pointing upper-right with 45 degrees by passing the first half-wave plate 208. Then, by passing the first Faraday rotator 207, the polarization is rotated by 45 degrees in the counterclockwise direction in the figure, and the excitation optical pulse and the correlated photon pairs are converted to a polarization state illustrated by a leftward arrow 417 in the figure, that is, to a p-polarized state.

The excitation optical pulse and the correlated photon pairs, which are output from the first nonreciprocal polarization converter 211 and are propagated in the clockwise direction over the optical loop, are input to the input/output port 301-3 of the polarization splitter/combiner 301. The excitation optical pulse and the correlated photon pairs input to the input/output port 301-3 are output from the input/output port 301-4 since they have the polarization states thereof in a p-polarized state. Accordingly, the excitation optical pulse and the correlated photon pairs are output from the input/output port 301-4, which is a different input/output port from the input/output port 301-1 to which the output light output from the excitation optical pulse shaper 10-2 is input. The polarization plane of the excitation optical pulse and correlated photon pairs that have been propagated in the clockwise direction over the optical loop and have output from the input/output port 301-4 is orthogonal to the polarization plane of the excitation optical pulse and correlated photon pairs which have been propagated in the counterclockwise direction over the optical loop and have output from the input/output port 301-4, described earlier.

In summary, also with the quantum entangled photon pair generator of the alternative embodiment, either type of the polarization entangled photon pairs and the time-bin entangled photon pairs can be output from the input/output port 301-4 of the polarization splitter/combiner 301. Accordingly, if the excitation optical pulse output from the excitation optical pulse shaper 10-2 is made to 1:1 polarization, then the polarization entangled photon pairs are generated in the optical loop, whereas, if the excitation optical pulse is made to p-polarized two consecutive optical pulses, then the time-bin entangled photon pairs are generated in the optical loop.

The light component including the wavelength components of the signal and idler lights output from the optical loop, specifically from the input/output port 301-4 of the polarization splitter/combiner 301, may have the SHG light wavelength component and the excitation optical pulse wavelength component eliminated to split the signal and idler lights to output on the appropriate, separate optical paths by means of the optical low-pass filter 112 and the wavelength separation filter 113.

According to the quantum entangled photon pair generator of the alternative embodiment, the excitation optical pulse to be input to the polarization splitter/combiner 301 is input through the input/output port 301-1, while the excitation optical pulse output with the correlated photon pairs from the optical loop is output from the input/output port 301-4. Thus, it has a constitution in which the input/output port to input the excitation optical pulse is different from the input/output port to output the excitation optical pulse, and thus the excitation optical pulse would not return to the excitation optical pulse shaper. Therefore, the unstable operation may not arise which would otherwise be caused by returning the excitation optical pulse to the excitation optical pulse shaper.

By contrast, according to the quantum entangled photon pair generator of the earlier described embodiment, it is expected that due to its constitution the excitation optical pulse output with the correlated photon pairs from the optical loop may return to the excitation optical pulse shaper even a little bit. However, in the quantum entangled photon pair generator of that embodiment, an optical element which prevents retrogression of lights, such as an optical isolator, may be employed in order to completely remove a possibility that the unstable operation would be caused by possibly returning the excitation optical pulse to the excitation optical pulse shaper.

The entire disclosure of Japanese patent application No. 2012-076296 filed on Mar. 29, 2012, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A quantum entangled photon pair generator comprising:
   an excitation optical pulse shaper receiving a linearly polarized optical pulse, and selectively outputting either one of a polarization excitation optical pulse pair to be a seedlight pulse for a polarization entangled photon pair and a consecutive excitation optical pulse pair to be a seedlight pulse for a time-bin entangled photon pair, pulses of the polarization excitation optical pulse pair having substantially a same peak intensity and respective polarization directions orthogonal to each other, pulses of the consecutive excitation optical pulse pair having substantially a same peak intensity and being linearly polarized to appear at different positions on a time axis;
   an optical interferometer receiving the polarization excitation optical pulse pair or the consecutive excitation optical pulse pair, and outputting a correlated photon pair which includes a signal photon and an idler photon generated through a parametric fluorescence process; and
   a quantum entangled photon pair extractor receiving an output light of said optical interferometer, and spatially extracting wavelength components corresponding to the signal photon and the idler photon to output the extracted wavelength components as the polarization entangled photon pair or the time-bin entangled photon pair.

2. The quantum entangled photon pair generator in accordance with claim 1, wherein said excitation optical pulse shaper comprises:
   a first half-wave plate rotating a polarization of the linearly polarized optical pulse by 0 degrees or 45 degrees;
   a first polarization splitter/combiner having a first input/output port receiving an input light, a second input/output port outputting one of linearly polarized light components of the input light which are orthogonal to each other, and a third input/output port outputting another of the linearly polarized light components;
   an optical delay device providing a time delay between the linearly polarized optical pulses output from the second input/output port and the third input/output port;
   a half mirror having a fourth input/output port receiving an output optical pulse output from the second input/output port and a fifth input/output port receiving an output optical pulse output from said optical delay device for combining the optical pulses received on the fourth input/output port and the fifth input/output port to each other, said half mirror further having a sixth input/output port outputting the combined pulses;
   a second half-wave plate rotating a polarization of an output optical pulse output from the sixth input/output port by 0 degrees or 45 degrees;
   a birefringent medium providing an optical phase difference between optic axes of an output optical pulse output from said second half-wave plate, the optic axes being orthogonal to each other; and
   a first 90-degree polarization rotator rotating the polarization of the linearly polarized optical pulse by 90 degrees, wherein
   said first 90-degree polarization rotator and said optical delay device are arranged on either one of two optical paths between said first polarization splitter/combiner and said half mirror, or are respectively arranged on the two optical paths.

3. The quantum entangled photon pair generator in accordance with claim 1, wherein
   said optical interferometer constitutes a Sagnac interferometer type of optical loop in which an optical path has input/output ends connected by a second polarization splitter/combiner to form an optical path loop, which includes a nonlinear optical medium and a second 90-degree polarization rotator,
   said nonlinear optical medium generating the correlated photon pair through the parametric fluorescence process,
   said second 90-degree polarization rotator rotating the polarization of the polarization excitation optical pulse pair or the consecutive excitation optical pulse pair by 90 degrees, and the polarizations of the signal photons and the idler photons by 90 degrees.

4. The quantum entangled photon pair generator in accordance with claim 1, wherein said quantum entangled photon pair extractor comprises:
   an optical band-pass filter separating an output light output from said excitation optical pulse shaper into a transmission light component and a reflecting light component to output the separated components;
   an optical low-pass filter eliminating a wavelength component other than a wavelength component corresponding to the correlated photon pair from an output light output from said optical band-pass filter; and
   a wavelength separation filter splitting the output light output from said optical low-pass filter into the signal photon and the idler photon which form a quantum entangled photon pair to output the signal photon and the idler photon on respective optical paths.

5. The quantum entangled photon pair generator in accordance with claim 3, wherein said quantum entangled photon pair extractor comprises:

a wavelength separation filter having a common input/output port and a plurality of transmission light input/output ports; and an optical low-pass filter eliminating a wavelength component other than a wavelength component corresponding to the correlated photon pair, wherein said wavelength separation filter receives an output light output from said excitation optical pulse shaper on either of the plurality of transmission light input/output ports to output the output light from the common input/output port toward the optical path loop, said wavelength separation filter receiving the signal photon and the idler photon output from the optical path loop on the common input/output port to output the signal photon and the idler photon from respective ones of the plurality of light input/output ports.

6. The quantum entangled photon pair generator in accordance with claim 3, wherein said quantum entangled photon pair extractor comprises:

an optical circulator having a seventh input/output port receiving an output light output from said excitation optical pulse shaper, an eighth input/output port outputting the output light received on the seventh input/output port, and a ninth input/output port outputting an output light output from the optical path loop;

an optical low-pass filter eliminating a wavelength component other than a wavelength component corresponding to the correlated photon pair from the output light output from the ninth input/output port; and a wavelength separation filter splitting an output light output from said optical low-pass filter into the signal photon and the idler photon which form a quantum entangled photon pair, and outputs the signal photon and the idler photon on respective optical paths.

7. The quantum entangled photon pair generator in accordance with claim 1, wherein the excitation optical pulse shaper comprises:

a first half-wave plate rotating a polarization of the linearly polarized optical pulse by 0 degrees or 45 degrees;

a first polarization splitter/combiner having a first input/output port receiving an input light, a second input/output port outputting one of the linearly polarized light components of the input light which are orthogonal to each other, and a third input/output port outputting another of the linearly polarized light components;

an optical delay device providing a time delay between the linearly polarized optical pulses output from the second input/output port and the third input/output port;

a half mirror having a fourth input/output port receiving an output optical pulse output from the second input/output port and a fifth input/output port receiving an output optical pulse output from said optical delay device, for combining the optical pulses received on the first input/output port and the second input/output port to each other, said half mirror further having a sixth input/output port outputting the combined pulses;

a second half-wave plate rotating a polarization of an output optical pulse output from the sixth input/output port by 0 degrees or 45 degrees; and a first 90-degree polarization rotator rotating the polarization of the linearly polarized optical pulse by 90 degrees; wherein said first 90-degree polarization rotator and said optical delay device are arranged on either one of two optical paths between said first polarization splitter/combiner and said half mirror, or are respectively arranged on the two optical paths, said optical interferometer constituting a Sagnac interferometer type of optical loop in which an optical path has input/output ends connected by a second polarization splitter/combiner to form an optical path loop, which includes a nonlinear optical medium and an optical phase bias circuit, said nonlinear optical medium generating the correlated photon pair through the parametric fluorescence process, said optical phase bias circuit comprising a first Faraday rotator rotating the polarization of the linearly polarized optical pulse by −45 degrees, a birefringent medium having optic axes X and Y, and a second Faraday rotator rotating the polarization of the linearly polarized optical pulse by −45 degrees, said first Faraday rotator, said birefringent medium and said second Faraday rotator being arranged in series in this order.

8. The quantum entangled photon pair generator in accordance with claim 1, wherein said excitation optical pulse shaper comprises:

a first half-wave plate rotating a polarization of the linearly polarized optical pulse by 0 degrees or 45 degrees;

a first polarization splitter/combiner having a first input/output port receiving an input light, a second input/output port outputting one of the linearly polarized light components of the input light which are orthogonal to each other, and a third input/output port, outputting another of the linearly polarized light components;

an optical delay device providing a time delay between the linearly polarized optical pulses output from the second input/output port and the third input/output port;

a half mirror having a fourth input/output port receiving an output optical pulse output from the second input/output port and a fifth input/output port receiving an output optical pulse output from said optical delay device for combining the optical pulses received on the fourth input/output port and the fifth input/output port to each other, said half mirror further having a sixth input/output port outputting the combined pulses;

a second half-wave plate rotating a polarization of an output optical pulse output from the sixth input/output port by 0 degrees or 45 degrees; and an optical phase bias circuit comprising a first Faraday rotator rotating the polarization of the linearly polarized optical pulse by −45 degrees, a birefringent medium having optic axes X and Y, and a second Faraday rotator rotating the polarization of the linearly polarized optical pulse by −45 degrees, said first Faraday rotator, said birefringent medium and said second Faraday rotator being arranged in series in this order, wherein said optical phase bias circuit and said optical delay device are arranged on either one of two optical paths between said first polarization splitter/combiner and said half mirror, or are respectively arranged on the two optical paths, said optical interferometer constituting a Sagnac interferometer type of optical loop in which an optical path has input/output ends connected by a second polarization splitter/combiner to form an optical path loop, which includes a nonlinear optical medium and a first 90-degree polarization rotator, said nonlinear optical medium generating the correlated photon pair through the parametric fluorescence process, and said first 90-degree polarization rotator rotating the polarization of the linearly polarized optical pulse by 90 degrees.

9. A quantum entangled photon pair generator comprising:
an excitation optical pulse shaper receiving a linearly polarized optical pulse, and selectively outputting one of a polarization excitation optical pulse pair to be a seedlight pulse for a polarization entangled photon pair and a consecutive excitation optical pulse pair to be a seedlight pulse for a time-bin entangled photon pair, pulses of the polarization excitation optical pulse pair having substantially a same peak intensity and respective polarization directions orthogonal to each other, pulses of the consecutive excitation optical pulse pair having substantially a same peak intensity and being linearly polarized to appear at different positions on a time axis; and
a quantum entangled photon pair extractor receiving the polarization excitation optical pulse pair or the consecutive excitation optical pulse pair to generate a correlated photon pair which including a signal photon and an idler photon through a parametric fluorescence process, and spatially extracting wavelength components corresponding to the signal photon and the idler photon to output the extracted wavelength components as the polarization entangled photon pair or the time-bin entangled photon pair.

10. The quantum entangled photon pair generator in accordance with claim 9, wherein said excitation optical pulse shaper comprises:
a first half-wave plate rotating a polarization of the linearly polarized optical pulse by 0 degrees or 45 degrees;
a first polarization splitter/combiner having a first input/output port receiving an input light, a second input/output port outputting one of the linearly polarized light components of the input light which are orthogonal to each other, and a third input/output port outputting another of the linearly polarized light components;
an optical delay device providing a time delay between linearly the polarized optical pulses output from the second input/output port and the third input/output port;
a half mirror having a fourth input/output port receiving an output optical pulse output from the second input/output port and a fifth input/output port receiving an output optical pulse output from said optical delay device for combining the optical pulses received on the fourth input/output port and the fifth input/output port to each other, said half mirror further comprising a sixth input/output port outputting the combined pulses;
a second half-wave plate rotating a polarization of an output optical pulse output from the sixth input/output port by 0 degrees or 45 degrees;
a birefringent medium providing an optical phase difference between optic axes of an output optical pulse output from said second half-wave plate, the optic axes being orthogonal to each other; and
a first 90-degree polarization rotator rotating a polarization of the linearly polarized optical pulse by 90 degrees, wherein
said first 90-degree polarization rotator and said optical delay device are arranged on either one of two optical paths between said first polarization splitter/combiner and said half mirror, or are respectively arranged on the two optical paths.

11. The quantum entangled photon pair generator in accordance with claim 9, wherein
said quantum entangled photon pair extractor constitutes a Sagnac interferometer type of optical loop in which an optical path has input/output ends connected by a polarization splitter/combiner to form an optical path loop, said polarization splitter/combiner having seventh through tenth input/output ports,
the optical path loop including a first nonreciprocal polarization converter, a second nonreciprocal polarization converter, and a nonlinear optical medium, which generates the correlated photon pair through the parametric fluorescence process, the correlated photon pair being output from the tenth input/output port;
said quantum entangled photon pair generator further comprising:
an optical low-pass filter eliminating a wavelength component other than a wavelength component corresponding to the correlated photon pair output from the tenth input/output port; and
a wavelength separation filter splitting an output light output from said optical low-pass filter into the signal photon and the idler photon to output the signal photon and the idler photon on respective optical paths.

12. The quantum entangled photon pair generator in accordance with claim 11, wherein
said first nonreciprocal polarization converter includes a first Faraday rotator and a first half-wave plate,
said first Faraday rotator rotating polarizations of the excitation optical pulse, the signal photon and the idler photon by 45 degrees in a counterclockwise direction,
said first half-wave plate being operative to the excitation optical pulse, the signal photon and the idler photon,
said second nonreciprocal polarization converter including a second Faraday rotator and a second half-wave plate,
said second Faraday rotator rotating polarizations of the excitation optical pulse, the signal photon and the idler photon by 45 degrees in the counterclockwise direction,
said second half-wave plate operative to the excitation optical pulse, the signal photon and the idler photon.

* * * * *